US007724387B2

(12) United States Patent
Ochiai et al.

(10) Patent No.: US 7,724,387 B2
(45) Date of Patent: May 25, 2010

(54) IMAGE PROCESSING APPARATUS, CONTROLLING METHOD FOR IMAGE PROCESSING APPARATUS, AND PROGRAM

(75) Inventors: Taketo Ochiai, Hanno (JP); Kiyoyuki Kakinuma, Chichibu (JP); Kazuo Otani, Kodaira (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 1464 days.

(21) Appl. No.: 11/085,090

(22) Filed: Mar. 22, 2005

(65) Prior Publication Data
US 2006/0187482 A1 Aug. 24, 2006

(30) Foreign Application Priority Data
Sep. 29, 2003 (JP) .............................. 2003-338680

(51) Int. Cl.
*G06F 3/12* (2006.01)
(52) U.S. Cl. ........................ 358/1.15; 358/471; 358/1.9; 358/530; 358/1.2; 358/474; 709/246; 709/207; 709/204; 379/100.9; 379/100.8; 379/211.01; 399/367; 399/82
(58) Field of Classification Search ................ 358/1.15, 358/1.9, 1.8, 1.2, 1.3, 1.1, 530, 540; 399/82; 379/100.1, 211.01, 100.08, 100.09; 709/246, 709/207, 204
See application file for complete search history.

(56) References Cited
U.S. PATENT DOCUMENTS

| | | | | |
|---|---|---|---|---|
| 4,935,821 A | * | 6/1990 | Sano et al. .................. | 358/401 |
| 5,038,218 A | * | 8/1991 | Matsumoto .................. | 358/296 |
| 5,113,251 A | * | 5/1992 | Ichiyanagi et al. .......... | 358/500 |
| 5,459,579 A | * | 10/1995 | Hu et al. ...................... | 358/296 |
| 5,467,202 A | * | 11/1995 | Washio et al. ............... | 358/448 |
| 5,717,501 A | * | 2/1998 | Iwamoto et al. ............. | 358/468 |
| 5,991,053 A | * | 11/1999 | Matsuo et al. .............. | 358/468 |
| 6,229,620 B1 | * | 5/2001 | Makitani et al. ........... | 358/1.15 |
| 6,236,815 B1 | * | 5/2001 | Kaneko et al. ................ | 399/45 |
| 7,307,763 B2 | * | 12/2007 | Yamamoto ................... | 358/474 |
| 7,315,388 B2 | * | 1/2008 | Fujiwara et al. ............ | 358/1.15 |

(Continued)

FOREIGN PATENT DOCUMENTS

JP 5-14704 1/1993

(Continued)

*Primary Examiner*—Negussie Worku
(74) *Attorney, Agent, or Firm*—Fitzpatrick, Cella, Harper & Scinto

(57) ABSTRACT

A scanner is provided with an image memory for storing therein image data read from an original by an image sensor, an image processing portion for effecting image processing on the image data, and a sending portion for sending the image data to an external equipment. The image processing portion is disposed in a route along which the image data is forwarded from the image memory to the sending portion, and the contents of the image processing by the image processing portion is made changeable over. The external equipment is provided with an image analyzing portion for obtaining first image data image-processed in a first image mode from the scanner and analyzing it, and detecting the state of the original (such as whether the original is a white sheet) from which the first image data has been read. On the basis of the result of the detection by the image analyzing portion, second image data image-processed in a second image mode is obtained from the scanner.

18 Claims, 14 Drawing Sheets

U.S. PATENT DOCUMENTS

| | | | |
|---|---|---|---|
| 7,414,760 B2 * | 8/2008 | Kato | 358/474 |
| 7,433,089 B2 * | 10/2008 | Enomoto | 358/474 |
| 2004/0105107 A1 * | 6/2004 | Takahashi | 358/1.9 |

FOREIGN PATENT DOCUMENTS

| | | |
|---|---|---|
| JP | 5-241313 | 9/1993 |
| JP | 9-200526 | 7/1997 |
| JP | 11-177825 | 7/1999 |
| JP | 2000-78395 | 3/2000 |
| JP | 2000-99692 | 4/2000 |
| JP | 2000-295394 | 10/2000 |
| JP | 2001-24885 | 1/2001 |
| JP | 2002-218164 | 8/2002 |

* cited by examiner

IMAGE PROCESSING APPARATUS, CONTROLLING METHOD FOR IMAGE PROCESSING APPARATUS, AND PROGRAM

BACKGROUND OF THE INVENTION

1. Field of the Invention

The invention relates to an image processing apparatus applicable to an image scanner capable of re-reading out image data from a memory, a controlling method for the image processing apparatus, and a program.

2. Description of Related Art

There have heretofore been image reading apparatuses for reading images from originals. Among the image reading apparatuses, for example, an image scanner (hereinafter simply referred to as the scanner) is provided with an image sensor for reading an image from an original, an image memory for temporarily storing therein image data outputted from the image sensor, etc. A specific example of the scanner is shown in FIG. 13 of the accompanying drawings.

FIG. 13 is a block diagram showing an example of the construction of the essential portions of the control system of an image reading apparatus (scanner) according to the prior art.

In FIG. 13, the scanner is provided with an image sensor 1304 for front side image, an image sensor 1309 for back side image, an image processing portion 1349, a line memory 1350, a CPU 1351, an interface 1352, a sending portion 1353 and an image memory 1355, and is connected to an external equipment (e.g. a host computer) 1357. In FIG. 13, the image processing portion 1349, the line memory 1350, the CPU 1351, the interface 1352 and the sending portion 1353 together constitute processing means 1354.

The scanner shown in FIG. 13 serves to read an original image while conveying an original, and when it has read the image on the surface of the original by an image sensor 1304 for front side image, image data corresponding to one line is written from the image sensor 1304 for front side image into the line memory 1350. Also, when it has read the image on the back side of the original by the image sensor 1309 for back side image, image data corresponding to one line is written from the image sensor 1309 for back side image into the line memory 1350. At this time, the image processing portion 1349 is preordered a reading mode by the external equipment 1357 through the interface 1352.

The CPU 1351 designates and writes a writing-in start position X1 shown in FIG. 14 of the accompanying drawings into the image memory 1355 while effecting image processing conforming to the above-mentioned pre-ordered reading mode on the image data corresponding to one line written into the line memory 1350, by the image processing portion 1349 disposed between the line memory 1350 and the image memory 1355.

The image data corresponding to one line is sent form the line memory 1350 a predetermined number of times (n times) at a predetermined pitch by the original being conveyed, whereby as shown in FIG. 14 of the accompanying drawing, the image data is written into the image memory while sequentially changing its writing-in start position ($X_2$, $X_3$, $X_4$, ... Xn) into the image memory 1355 by the CPU 1351. At the same time, the image data stored in the image memory 1355 is sent to the external equipment 1357 through the sending portion 1353. The image memory 1355 has a storing capacity sufficient to store therein images obtained by the scanning of the original.

On the other hand, in an image reading apparatus for reading an original image with an original being conveyed, there has been proposed a technique designed to effect warning or change a reading operation when the size of the original read is larger than the size of an image memory storing image information therein (see, for example, Japanese Patent Application Laid-Open No. 2000-295394).

In the scanner described above, it is usually supposed to read out image data from the image memory 1355 in one kind of image mode for a sheet of original and therefore, as shown in FIGS. 13 and 14, image processing suited for a desired mode is effected by the image processing portion 1349 when the image data is stored into the image memory 1355.

On the other hand, there is a use in which image data is read out from the image memory 1355 in a plurality of modes such as a color image mode and a black-and-white image mode for a sheet of original. For example, the color image mode is a mode for preserving the image data for image perusal, and the black-and-white image mode is a mode for effecting optical character recognition (OCR). At this time, in the color image mode, the amount of image data becomes great because of the use for image perusal and the resolution need not be high resolution which requires a preservation space, whereas in the black-and-white image mode, there is resolution necessary for effecting OCR analysis.

However, in the scanner which reads the original image while conveying the original as described above (a scanner of a sheet feeding type), only the image data stored in the image memory 1355 can be outputted. To output image data from the image memory 1355 in another image mode, re-scanning must be effected. That is, the image data once stored in the image memory 1355 cannot be read out with the image mode changed, and to read out the image data from the image memory 1355 by a plurality of different image modes for a sheet of original, the image data had to be again stored from the image sensor 1304 into the image memory 1355.

Specifically, to obtain a plurality of different image data from a sheet of original, it has been necessary to repeat the operation of storing the image data of one and the same original into the image memory 1355 while carrying out image processing conforming to a desired image mode by the image processing portion 1349.

That is, in the scanner of the sheet feeding type, to repeat the operation of storing the image data of one and the same original into the image memory 1355 in a plurality of image modes, it is necessary to provide such a mechanism or the like as can feed the original discharged from the scanner again to the scanner, and this has led to the problem of a great increase in cost.

So, in a case where it is necessary to read out image data in a plurality of image modes, for example, in the above-described use which requires a plurality of image modes such as the color image mode and the black-and-white image mode, the scanner has performed a scanning operation at a resolution necessary for effecting the OCR analysis and in the color image mode, has stored image data obtained by the scanning operation into the image memory 1355, has transmitted the stored image data to the external equipment 1357 such as, for example, a PC, and has effected resolution conversion for the color image in the external equipment, and has effected mode conversion from the color to the black-and-white for the black-and-white image.

Generally, however, the resolution conversion and the mode conversion can be done more quickly by hardware in the scanner than by software and therefore, when the resolution conversion and the mode change are effected by software in the external equipment, and particularly when image data becomes great like color image data or the like, not only very much time is required for the converting process, but also very much time is required for the forwarding of the image data from the scanner to the external equipment 1357. This also holds true of image rotation which will be described later.

Also, it is often the case that color image data is generally JPEG (joint photographic experts group)-compressed and handled and therefore, it is possible to adopt a technique of JPEG-compressing the color image data in the scanner, and then forwarding the color image data to the external equipment 1357 to thereby make the size of the image data small, but JPEG is non-reversible compression and therefore, when the JPEG-compressed color image data is decompressed to be OCR-analyzed, the image data is deteriorated from the former image before compressed. This has led to the problem that OCR accuracy drops.

Further, to produce color image data for preservation, compressed high resolution color image data must be decompressed, resolution conversion must be effected and JPEG compression must be effected again, and this had led to the problem that not only the color image data for preservation is further deteriorated in image, but also very much time is required for processing.

Therein, by adding hardware such as an image processing board to the external equipment 1357, a reduction in processing by software can be improved, but the cost becomes a factor.

Also, to analyze the contents of a scanned image in the external equipment, and realize (1) the function of not preserving image data (particularly the function used to automatically discriminate on which of one side two sides of an original the image is present (hereinafter referred to as the white sheet skip) if the image data is a blank sheet (a state in which image data is absent), (2) the function of detecting the size of the original image (hereinafter referred to as the original image size detection), (3) the function of effecting image erection with respect to the conveying direction of the original (hereinafter referred to as the orientation detection), etc., it is impossible to read out the image data with the mode of the image data once stored in the image memory 1355 changed and therefore, processing must be carried out from image data subjected to image processing suited for a desired mode. For example, the following problems arise.

(1) When the white sheet skip is to be done, to judge and analyze whether the image data is a blank sheet, the image data maybe black-and-white image data of very low resolution, but in the case of color image data, very much time is required for the forwarding and analysis of the color image data, and moreover in the case of a blank sheet, the image data thereof is sometimes not required. In spite of the fact that it is better for the time until whether the image data is a white sheet is judged to be short, particularly when the image data is a blank sheet, the forwarding and analysis time of the image data have become useless.

(2) When the original image size detection is to be effected, to judge and analyze the size of image data read from the original, the image data may be black-and-white image data of very low resolution, but in the case of color image data, very much time has been required for the forwarding and analysis of the color image data, and in a case where the color image data has been JPEG-compressed, very much time has been required for the decompression and analysis of the compressed image data and the recompression of the image data, and the image has been further deteriorated by the decompression and recompression of non-reversible compressed data.

(3) When the orientation detection is to be effected, to judge and analyze the erecting orientation of image data, the image data may be black-and-white image data, but in the case of color image data, very much time has been required for the forwarding and analysis and rotation of the color image data, and in a case where the color image data has been JPEG-compressed, very much time has been required for the decompression, analysis and rotation of the compressed image data and the recompression of the rotated image, and the image has been further deteriorated by the decompression and recompression of irreversible compressed data.

At this time, image rotation, as described above, can be effected more quickly by the hardware in the scanner than by the software and therefore, when the image rotation is effected by the software in the external equipment, and particularly when the image data becomes great like the color image data or the like, very much time is required for the rotating process. However, when the orientation detection is effected by the software in the external equipment, the angle of rotation of the image can be detected at that point of time, but the image data once stored in the image memory 1355 cannot be read out with the mode of the image data changed and therefore, desired rotated image data cannot be forwarded again from the scanner to the external equipment 1357, and even if a rotating mechanism was provided on the hardware in the scanner, it could not be utilized.

SUMMARY OF THE INVENTION

It is an object of the present invention to provide an image processing apparatus which enables image data to be obtained under a plurality of image conditions for one operation of storing image data into storing means, and can improve the obtainment efficiency of the image data from the image processing apparatus by an external equipment, a controlling method for the image processing apparatus, and a program.

In order to achieve the above object, an processing apparatus according to an embodiment of the present invention is provided with a storing portion for storing therein image data read from an original by a reading portion, an image processing portion for selectively executing image processing of producing first image data based n a first image condition from the image data and image processing of producing second image data based on a second image condition, and a sending portion for sending the image data to an external equipment, and is characterized in that the image processing portion is disposed in a route along which the image data is forwarded from the storing means to the sending means, the image data read from the original by the reading portion is stored in the storing portion in a state in which both of the first image data and the second image data can be produced, and image processing is effected on the image data stored in the storing portion by the image processing portion, whereby one or both of the first image data and the second image data are produced, and are sent to the external equipment by the sending portion.

By the above-described construction, the image data read from the original is stored in the storing means in a state in which both of the first image data and the second image data can be produced and therefore, the image data can be obtained under a plurality of image conditions for an operation of storing the image data into the storing means, and the obtainment efficiency of the image data from the image processing apparatus by the external equipment can be improved.

The above and other objects, features and advantages of the present invention will become more apparent upon consideration of the following description of the preferred embodiments of the present invention taken in conjunction with the accompanying drawings.

DETAILED DESCRIPTION OF THE PREFERRED EMBODIMENTS

Some embodiments of the present invention will hereinafter be described with reference to the drawings.

First Embodiment

Figure 1:
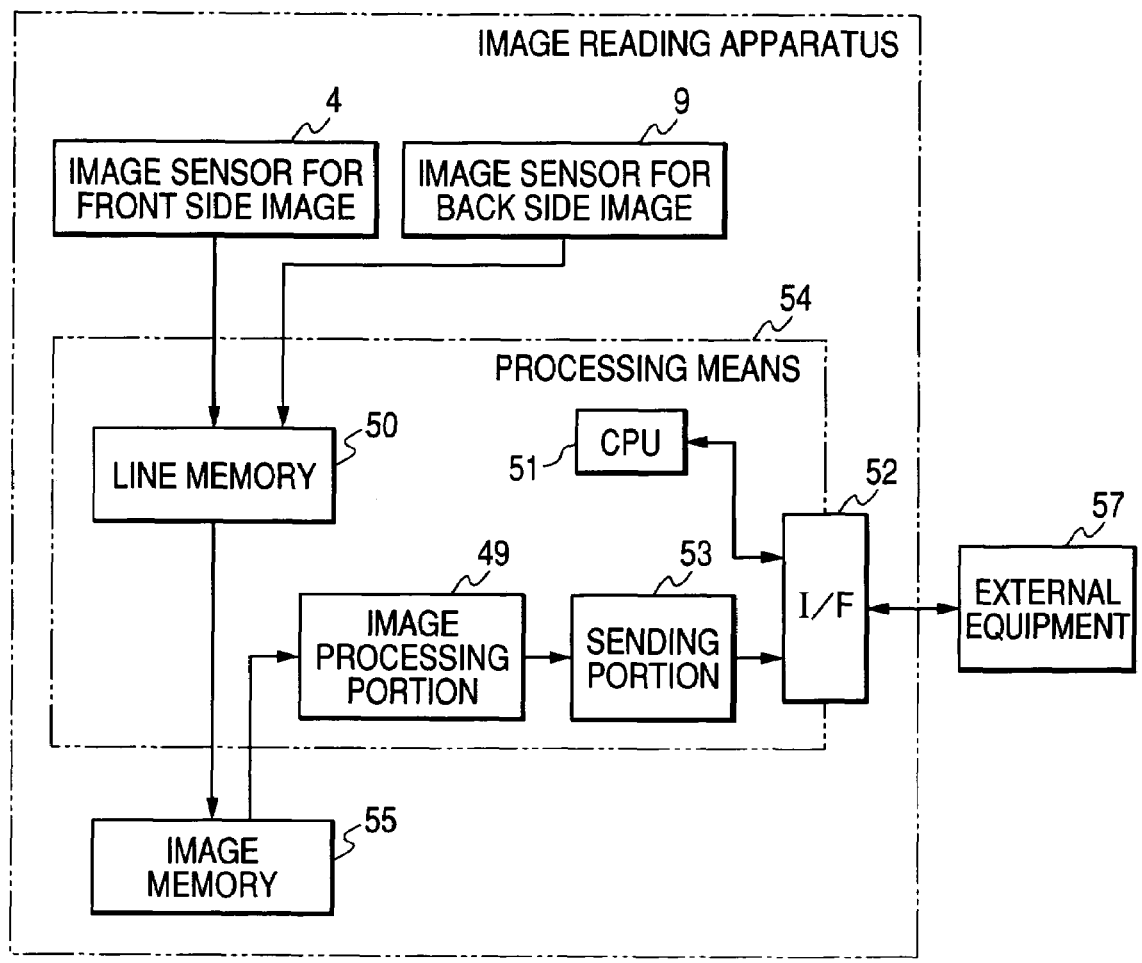
FIG. 1 is a block diagram showing an example of the construction of the essential portions of the control system of an image reading apparatus according to a first embodiment of the present invention.

FIG. 1 is a block diagram showing an example of the construction of the essential portions of the control system of an image reading apparatus according to a first embodiment of the present invention.

In FIG. 1, the image reading apparatus (image processing apparatus) is provided with an image sensor 4 (reading means) for front side image, an image sensor 9 (reading means) for back side image, an image processing portion 49 (image processing means), a line memory 50, a CPU 51, an interface 52, a sending portion 53 (sending means) and an image memory 55 (storing means), and is connected to an external equipment 57 (e.g. a host computer). In FIG. 1, the image processing portion 49, the line memory 50, the CPU 51, the interface 52 and the sending portion 53 together constitute processing means 54.

In the present embodiment, a document scanner of a sheet-through type (hereinafter simply referred to as the scanner) for reading an original image while conveying an original will be described as an example of the image reading apparatus.

Figure 3:
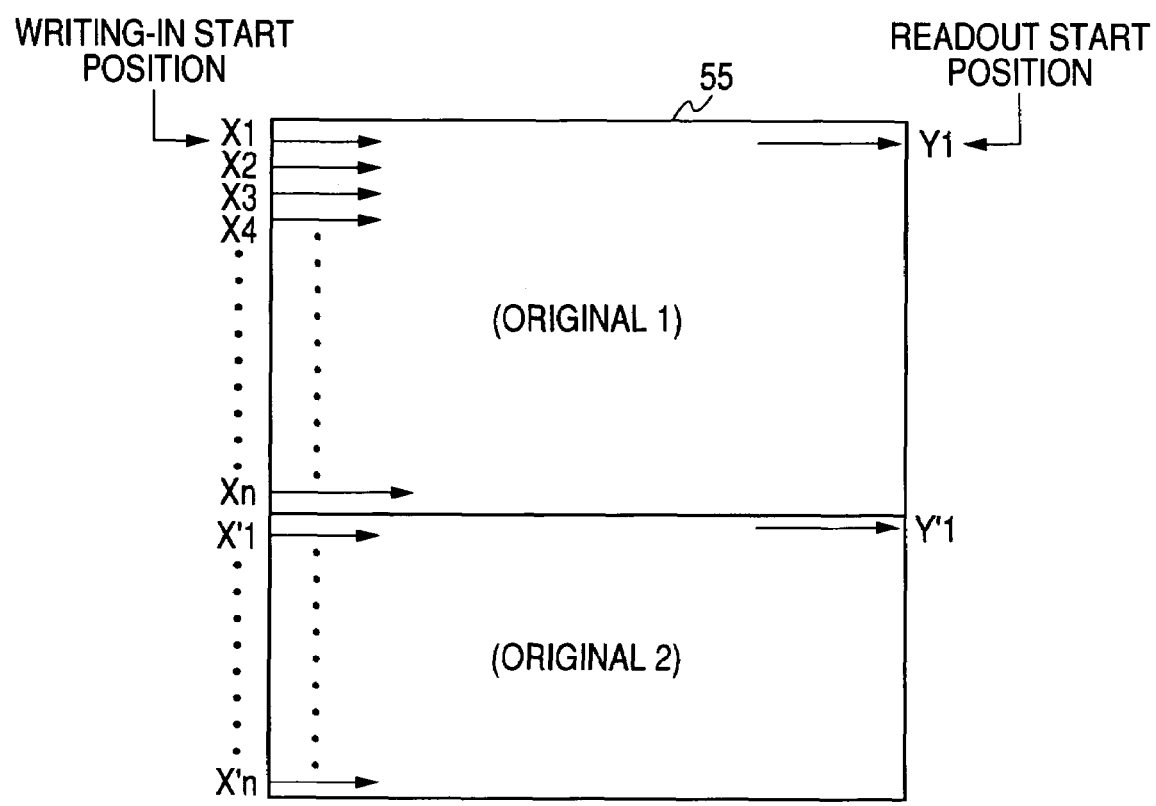
FIG. 3 shows the writing-in start position and readout start position of the image memory of the image reading apparatus.

The image sensor 4 for front side image reads an image on the front side of the original, and photoelectrically converts the read image (optical image) into an electrical signal. The image sensor 9 for back side image reads an image on the back side of the original, and photoelectrically converts the read image (optical image) into an electrical signal. The line memory 50 is a memory for storing therein image data outputted from the image sensor 4 for front side image and image data outputted from the image sensor 9 for back side image for each line. The image memory 55 is a memory for storing therein the image data outputted from the line memory 50, and has a construction as shown in FIG. 3.

The image processing portion 49 is disposed in a route along which the image data is forwarded from the image memory 55 to the sending portion 53, and is designed to be capable of changing over the contents of image processing in the image processing portion 49. The image processing portion 49 effects image processings (conversion of the number of colors, image gradation number conversion, image resolution conversion, image area conversion, image compression, image rotation, etc.) on the image data read out from the image memory 55.

The CPU 51 is a central processing unit which governs the control of each portion of the scanner, and executes processing shown in the flow chart of FIG. 4 which will be described later, on the basis of a program stored in a storing portion that is comprised of a computer-readable medium. The interface 52 governs an interface when communication is effected between the scanner and the external equipment 57. The sending portion 53 sends the image data subjected to image processings and image component conversion by the image processing portion 49 to the external equipment 57 through the interface 52.

The external equipment 57 executes processing shown in the flow chart of FIG. 5 which will be described later, on the basis of the program stored in the storing portion, not shown.

Figure 2:
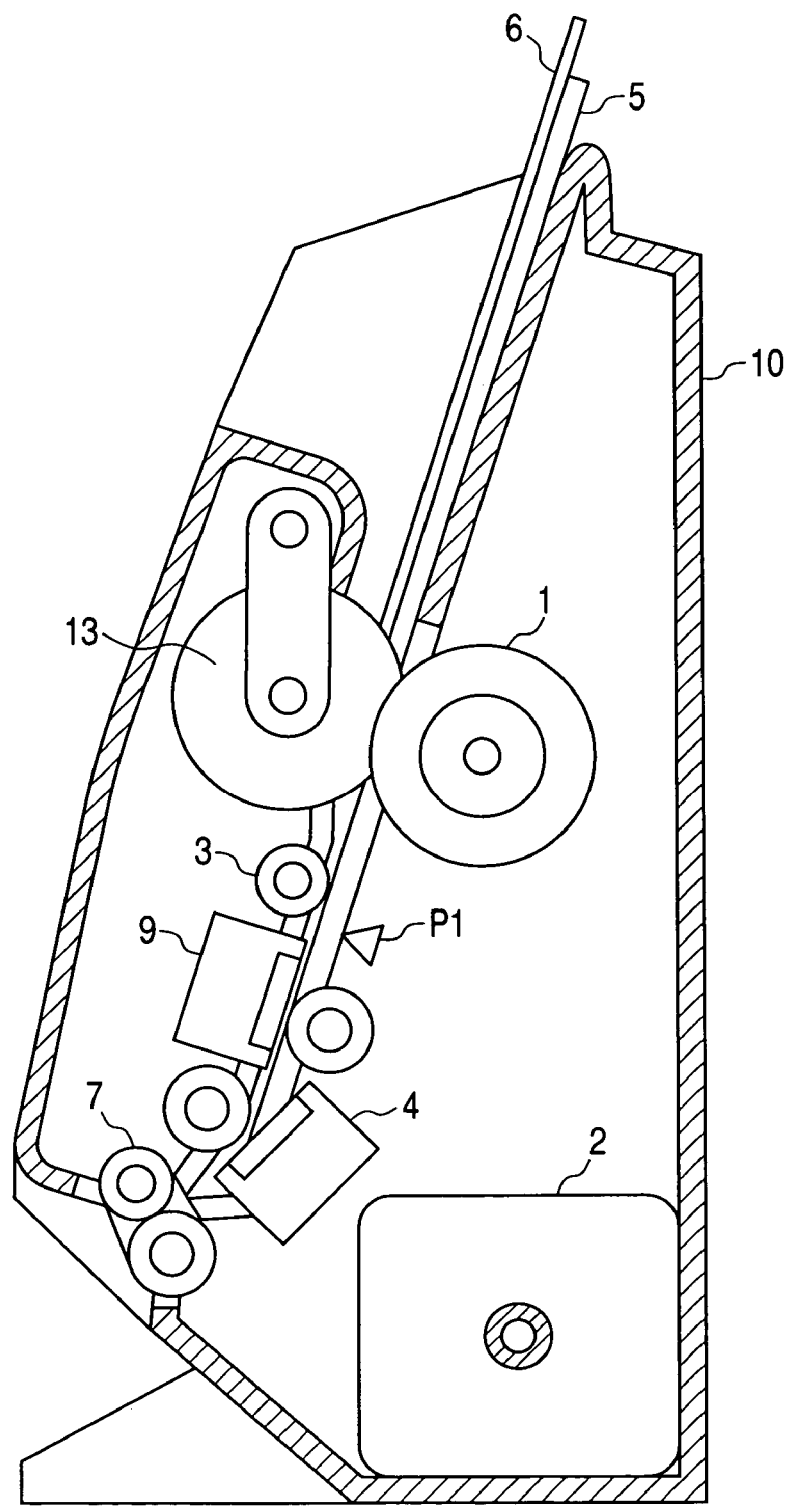
FIG. 2 is a cross-sectional view showing the interval structure of the essential portions of the image reading apparatus.

FIG. 2 is a cross-sectional view showing the internal structure of the essential portions of the scanner.

In FIG. 2, the scanner has a sheet feeding roller 1, a motor 2, a conveying roller 3, sheet discharging rollers 7, a separating roller 13, the image sensor for front side image (reading sensor for front side image) 4, an original stand 5, the image sensor for back side image (reading sensor for back side image) 9, a sensor P1 and an original detecting sensor (not shown) provided in a housing 10.

The original detecting sensor (not shown) detects whether originals 6 are placed on the original stand 5. The motor 2 drives the sheet feeding roller 1, the conveying roller 3, the sheet discharging rollers 7 and the separating roller 13, and comprises, for example, a stepping motor. The sheet feeding roller 1 feeds the originals 6 placed on the original stand 5 to the conveying roller 3 side. The conveying roller 3 conveys the originals 6 fed by the sheet feeding roller 1 to a reading position side. The separating roller 13 separates a plurality of originals 6 placed on the original stand 5 one by one. The sheet feeding roller 1 is controlled so as to be rotated at a low speed relative to the conveying roller 3.

The sensor P1 is a sensor for detecting the leading edge of the original 6. The image sensor for front side image (reading sensor for front side image) 4 is a sensor for reading an image on the front side of the original. The image sensor for back side image (reading sensor for back side image) 9 is a sensor for reading on image on the back side of the original. The CPU 51 effects the measurement of time by a timer or the like, not shown, and the measurement of the driving pulse number of the motor 2 with the fact that the leading edge of the conveyed original 6 has arrived at the position of the sensor P1 as the reference, to thereby judge that with the further conveyance of the original, the leading edge of the original 6 has arrived at the positions of the image sensor for front side image 4 and the image sensor for back side image 9. The sheet discharging rollers 7 discharge the original 6 of which the image has been read to the outside of the scanner.

FIG. 3 shows the writing-in start position and readout start position of the image memory 55 of the scanner.

In FIG. 3, the storing area of the image memory 55 is divided, for example, into a storing area corresponding to the read image of an original 1 and a storing area corresponding to the read image of an original 2. X1 is an image data writing-in start position corresponding to the read image of the original 1, X1 is an image data writing-in start position corresponding to the read image of the original 2, Y1 is an image data readout start position corresponding to the read image of the original 1, and Y'1 is an image data readout start position corresponding to the read image of the original 2.

The operation in the present embodiment will now be described in detail with reference to the flow charts of FIGS. 4 and 5.

Figure 4:
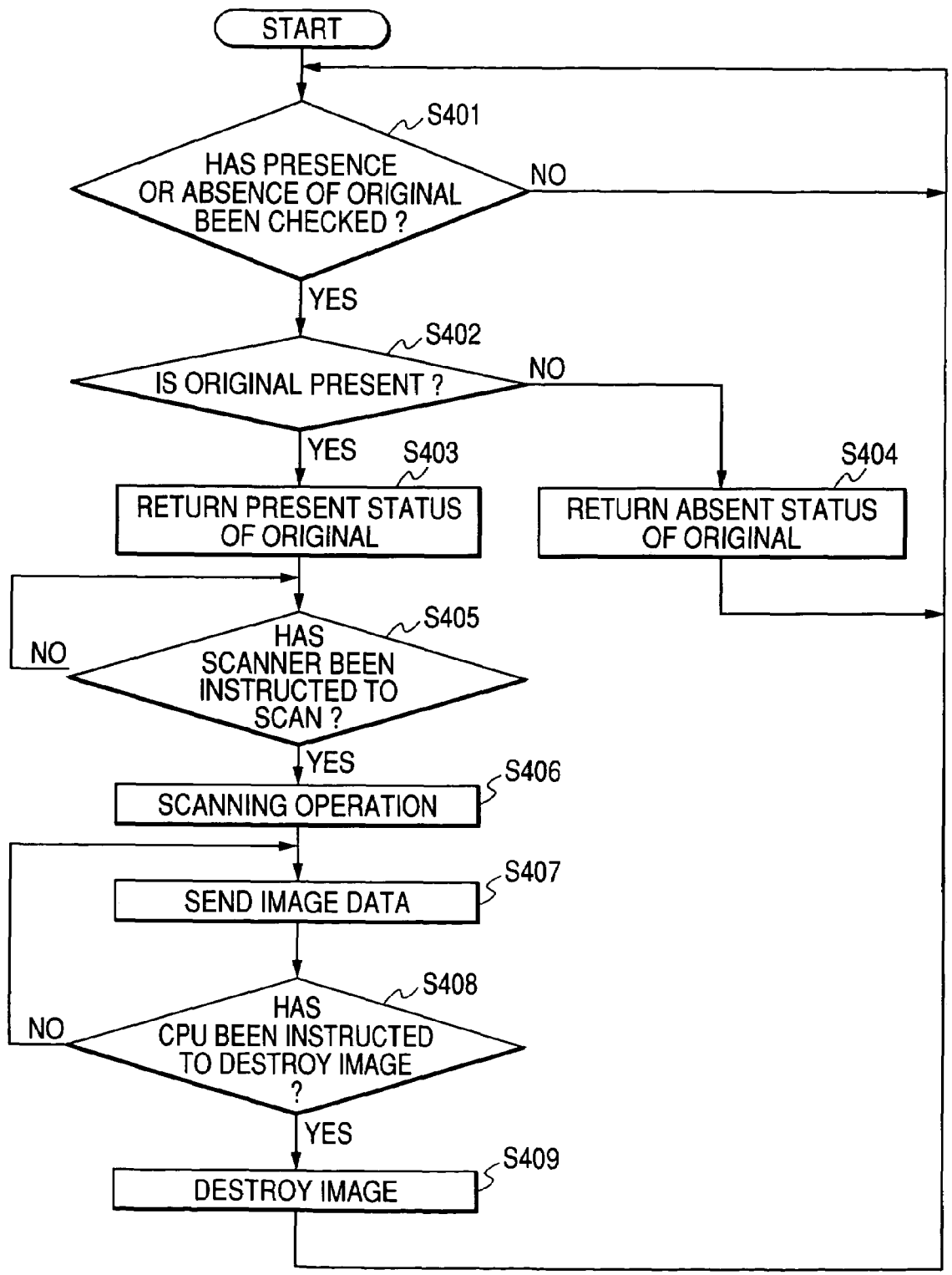
FIG. 4 is a flow chart showing the processing by the image reading apparatus.

FIG. 4 is a flow chart showing the processing by the scanner.

In FIG. 4, when the CPU 51 of the scanner is instructed to start the reading of the image of the original by the external equipment 57, the CPU 51 judges on the basis of the output signal of the original detecting sensor, not shown, whether the original 6 is placed on the original stand 5 (step S401). If the original 6 is not placed on the original stand (NO at a step S402), the CPU 51 returns the absent status of the original to the external equipment 57 (step S404, and return is made to the step S401. On the other hand, if the original 6 is placed on the original stand 5 (YES at the step S402), the CPU 51 returns the present status of the original to the external equipment 57 (step S403), and waits for instructions to scan from the external equipment 57 (step S404).

When the instructions to scan are transmitted from the external equipment 57 to the CPU 51 (YES at a step S405), the CPU 51 rotatively drives the motor 2, whereby the original 6 on the original stand 5 is pulled in by the sheet feeding roller 1 rotated at a lower speed than the conveying roller 3, is separated by the separating roller 13 and is conveyed by the conveying roller 3. The CPU 51, when it effects the time measurement by the timer or the like, not shown, and the measurement of the driving pulse number of the original 6 at the sensor P1 as the reference, to thereby judge that the leading edge of the original 6 has arrived at the position of the image sensor for front side image 4 or the image sensor for back side image 9, starts the operation of scanning the front side or the back side or the two sides of the original 6 by the sensor concerned, on the basis of image read side information (information indicating which of the front side, back side or two sides of the original is to be read) set before the start of the scanning operation (step S406). At the same time, the CPU 51 communicates to the external equipment 57 that the reading of the image of the original 6 has been started.

In the case of front side scanning in which the image on the front side of the original 6 is read by the image sensor for front side image 4, image data corresponding to one line is written from the image sensor for front side image 4 into the line memory 50 with the front side scanning. The CPU 51 designates the writing-in start position X1 indicated in FIG. 3 to the image memory 55 and writes the image data corresponding to one line written into the line memory 50 into the writing-in start position X1. The image data corresponding to one line is written into the image memory 55 while sequentially changing the writing position into the image memory 55 by the CPU 51, as shown in FIG. 3, by being sent a predetermined number of times (n times) by the original 6 being conveyed.

The image memory 55 has a storing capacity sufficient to store therein image data corresponding to image information printed (or described) on the original 6, and also can store therein image data corresponding to image information printed (or described) on a plurality of originals 6 so that the conveyance of the original 6 and the reading of the original image can be effected in non-synchronism with the forwarding of the image data to the external equipment 57.

In the case of two-side scanning in which the images of the front side and back side of the original 6 are read by the image sensor for front side image 4 and the image sensor for back side image 9, respectively, the CPU 51 effects the above-described front side scanning and back side scanning at a time, and as described above, writes image data resulting from the front side scanning and back side scanning into the line memory 50, and thereafter writes the image data into the image memory 55.

Here, in a case where a plurality of originals are continuously fed and the images thereof are read, the CPU 51, when the original 6 has passed the sheet feeding roller 1, starts the operation of feeding the next original 6' by the sheet feeding roller 1. As described above, however, the sheet feeding roller 1 is rotated at a low speed relative to the conveying roller 3 and therefore, the next original 6' does not catch up with the original 6, and when the next original 6' has arrived at the sensor P1, a predetermined interval is kept between the original 6 and the next original 6'.

When thereafter, the above-described scanning operation for the original 6 is completed, the CPU 51 discharges the original 6 to the outside of the scanner by the discharging rollers 7. This also holds true of the next original 6'. The above-described sequence is repeated until the originals become absent on the original stand 5.

On the other hand, when an image obtaining command is transmitted from the external equipment 57 to the scanner, the CPU 51 designates a readout start position Y1 shown in FIG. 3 and reads out the image data stored in the image memory 55. The CPU 51 effects image processing conforming to an image component designated from the external equipment 57 on the read-out image data by the image processing portion 49, and sends the image data to the external equipment 57 through the sending portion 53 (step S407).

When the image obtaining command is again transmitted from the external equipment 57 to the scanner, the CPU 51 again designates the read out start position Y1 shown in FIG. 3 and reads out the image data stored in the image memory 55. The CPU 51 effects image processing and image component conversion conforming to the image component designated from the external equipment 57 on the read-out image data by the image processing portion 49, and sends the image data to the external equipment 57 through the sending portion 53 (step S407).

The CPU 51 repetitively sends the image data to the external equipment 57 through the sending portion 53 until an image destroying command is transmitted from the external equipment 57. When the image destroying command is transmitted from the external equipment 57 (YES at a step S408), the CPU 51 destroys the image data corresponding to the original 6 which is stored in the image memory 55 (step S409).

When an image obtaining command corresponding to the next original 6' is transmitted from the external equipment 57, the CPU 51 designates a readout start position Y'1 corresponding to the next original 6' which is shown in FIG. 3 and reads out the image data corresponding to the next original 6' which is stored in the image memory 55. The CPU 51 effects image processing and image component conversion conforming to the image component designated from the external equipment on the read-out image data by the image processing portion 49, and sends the image data to the external equipment 57 through the sending portion 53 (step S407).

Figure 5:
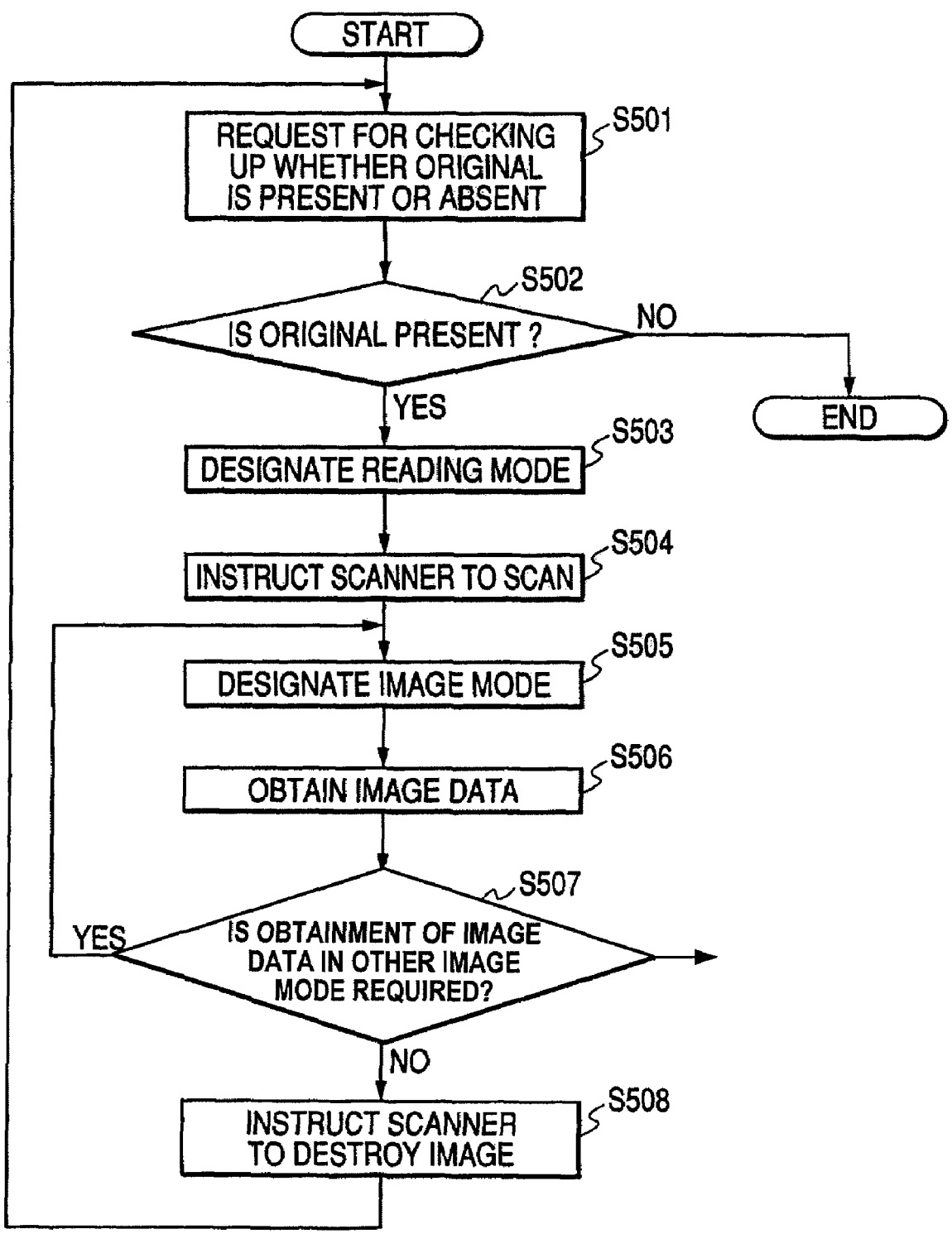
FIG. 5 is a flow chart showing the processing by an external equipment.

FIG. 5 is a flow chart showing the processing by the external equipment 57.

In FIG. 5, the external equipment 57 issues to the scanner a request for checking up the presence or absence of the original on the original stand 5 (step S501). If the status transmitted from the scanner is a present status of original (YES at a step S502), the external equipment 57 gives instructions to execute scanning to the scanner, whereby it can start the reading of the image of the original. On the other hand, if the status transmitted from the scanner is an absent status of original (NO at the step S502), the external equipment 57 terminates the original image reading process.

Now, in the scanner, as described above, there is a use of reading out image data from the image memory 55 in a plurality of image modes such as a color image mode and a black-and-white image mode for a sheet of original. For example, the color image mode is a mode for preserving image data for image perusal, and the black-and-white image mode is a mode for effecting OCR. At this time, in the color image mode, because of its being for image perusal, the amount of image data becomes great and the resolution need not be a high resolution which requires a preservation space, while in the black-and-white image mode, there is resolution necessary for effecting OCR analysis.

Also, it is often the case that color image data is generally JPEG-compressed and handled and therefore, it is possible to adopt a technique of JPEG-compressing the color image data in the scanner, and then forwarding the color image data to thereby make the size of the image data small.

That is, for the read image of a sheet of original, there is a case where image processing is required, for example, in a combination of "color, resolution: 100 dpi (dot per inch), compressing method: JPEG compression" and "black-and-white, resolution: 300 dpi, compressing method: MMR (modified modified read) compression".

So, when plural kinds of image data including color image data are to be obtained, such as when a desired image component for a sheet of original is color, when it is gray scale, when it is color and black-and-white, and when it is color, gray scale and black-and-white, the external equipment 57 instructs the scanner to scan in a color image mode.

Also, in the case of a gray scale or black-and-white image component, there exists an image made to lose a designated color (hereinafter referred to as the dropout), or an image emphasized in a designated color (hereinafter referred to as the color emphasis). The gray scale or black-and-white image component is monochrome and therefore, a particular color component cannot be lost or emphasized from the gray scale or black-and-white image component. Accordingly, with regard to a plurality of image components including the gray scale or black-and-white image component of the kind such as the above-mentioned dropout or color emphasis, it is necessary to give the instructions to scan in the color image mode.

Consequently, the external equipment 57 instructs the scanner to scan in the color image mode when plural kinds of image data including the dropout or color emphasis are to be obtained from the scanner, such as when the desired image component for a sheet of original is a gray scale of different dropout or color emphasis, when it is black-and-white of different dropout or color emphasis, and when it is a gray scale and black-and-white of different dropout or color emphasis.

The external equipment 57 instructs the scanner to scan in the gray scale when plural kinds of image data not including color information are to be obtained from the scanner, such as when the desired image component for a sheet of original is gray scale, and when it is gray scale and black-and-white.

Also, when image component conversion to black-and-white is to be effected in the image processing portion 49 of the scanner, conversion accuracy becomes higher in the conversion from a gray scale image into a black-and-white image of different image resolution than in the conversion from a black-and-white image into a black-and-white image of different image resolution. This is because a black-and-white image has only an information amount of two stages (1 bit) per pixel, whereas a gray scale image has an information amount of e.g. 256 stages (8 bits) per pixel.

Consequently, assuming that if for example, image resolution is converted into ⅓, in a case where a gray scale image is converted into a black-and-white image when the slice level of black-and-white conversion is 128, three pixels are e.g. 127, 127, 255, $$127, 127, 255 \rightarrow (127+127+255)/3 = 169,$$

and 169>128 (slice level) and therefore, when black-and-white conversion is effected here, the result becomes 1 (white).

On the other hand, in a case where conversion is effected from an image already converted into black-and-white, the image has been converted into black-and-white at first and therefore, three pixels (127, 127, 255) are (0, 0, 1), respectively, and $$0, 0, 1 \rightarrow (0+0+1)/3 = 0.3333,$$

and since 0.3333<0.5, the image becomes 0 (black).

As described above, 255 is pure white and therefore, when the above-mentioned three pixels are to be converted into image resolution ⅓, it is expected that they are converted into white pixels, but conversion as expected will be done better if conversion is done form a gray scale image. Consequently, when plural kinds of black-and-white image data of different resolution not including color information are to be obtained, such as a case of black-and-white differing in resolution, the scanner is instructed to scan at the gray scale.

Also, in a case when as described above, image processing is required, for example, in a combination of "color, resolution: 100 dpi (dot per inch), compressing method: JPEG compression" and "black-and-white, resolution: 300 dpi, compressing method: MMR compression", the scanner is instructed to scan at image resolution of 300 dpi in order to realize resolution (image resolution) of 100 dpi and resolution (image resolution) of 300 dpi.

The external equipment 57 designates a reading mode to the scanner through the interface 52 (step S503), and gives the above-mentioned instructions to scan (step S504), and thereafter designates a first image mode (e.g. color, 100 dpi, JPEG compression) (a first image condition) (step S505). The external equipment 57 effects the obtainment of first image data image-processed in the first image mode by the image processing portion 49 from the scanner. (step S506).

When the obtainment of the first image data in the first image mode has completed, the external equipment 57 commands the scanner to change over the image mode through the interface 52. In response, the scanner changes over the image mode. The external equipment 57 obtains the second image data image-processed in the second image mode (e.g. blackand-white, 300 dpi, MMR compression) (a second image condition) by the image processing portion 49 from the scanner. (step S506).

When the external equipment 57 could obtain from the scanner the image data image-processed in the above-mentioned first and second image modes by the image processing portion 49 of the scanner (NO at a step S507), the external equipment 57 instructs the scanner to destroy the image data (step S508), and effects the obtainment of image data corresponding to the next original. The external equipment 57 repeats the obtainment of the above-mentioned image data from the scanner until image data corresponding to the reading of the images of all originals set on the original stand become exhausted.

In this case, in the scanner, it is possible to store the image data inputted by the image sensor in the image memory 55 in an image mode in which both of the above-mentioned first image data and the above-mentioned second image data can be produced.

As described above, according to the present embodiment, the image processing portion 49 of the scanner is disposed in the route along which the image data is forwarded from the image memory 55 to the sending portion 53, and when the image data stored in the image memory 55 has been read out, image processing is effected by the image processing portion 49 and therefore, it becomes unnecessary to repeat the operation of storing the image data into the image memory while effecting image processing as in the prior art, and one operation of storing the image data into the image memory 55 is enough, and it becomes unnecessary to provide a mechanism for performing the operation of storing the image data into the image memory 55 a plurality of times.

Also, by simply changing the disposition of the image processing portion 49 (disposing the image processing portion 49 in the route along which the image data is forwarded from the image memory 55 to the sending portion 53) without increasing the number of the image memories 55, it is possible to realize such one operation of storing the image data into the image memory 55 as described above and therefore, it is unnecessary to add hardware and a reduction in cost can be achieved, and also it is possible to shorten the time for obtaining the image data from the scanner by the external equipment 57, and improve the obtainment efficiency of the image data.

Also, for example, it is possible to store image data inputted from the image sensor into the image memory 55 in a certain mode (e.g. an image mode in which at lowest, the number of image colors is great, the luminance is high, the number of image gradations is great, the image resolution is high, and the image area is large), and read out the image data of plural kinds of image modes from the image memory 55 in an image mode equal to an image mode corresponding to the image data stored in the image memory 55, or a certain image mode (an image mode in which the number of image colors is smaller, the luminance is lower, the number of image gradations is smaller, the image resolution is lower and the image area is smaller than in the image data stored in the image memory 55, or an image mode comprising any combination of these), thereby obtaining image data in a plurality of image modes for one operation of storing the image data into the image memory 55.

Second Embodiment

A second embodiment of the present invention will now be described. This embodiment differs from the above-described first embodiment in the points shown in the following description of the operation. The other elements of the present embodiment are the same as those corresponding in FIGS. 1, 2 and 3 described above and therefore need not be described.

Figure 6:
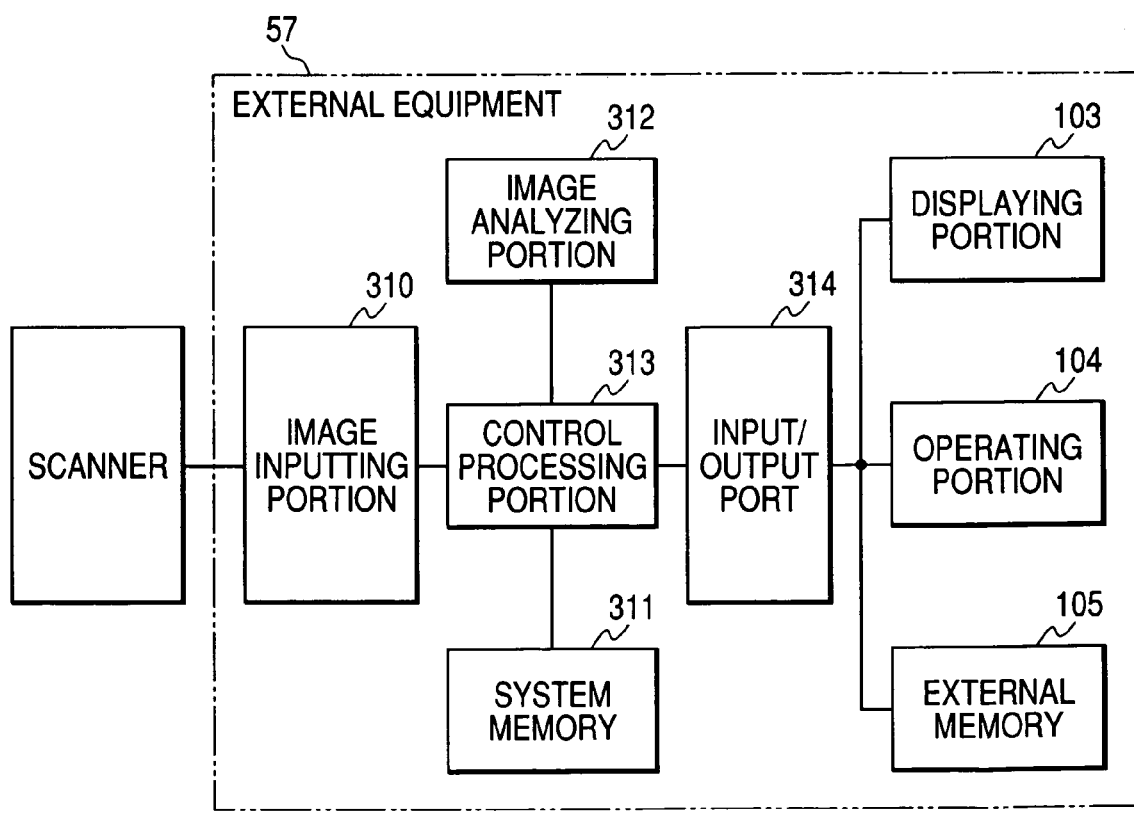
FIG. 6 is a block diagram showing an example of the construction of the essential portions of the control system of an external equipment according to a second embodiment of the present invention.

FIG. 6 is a block diagram showing an example of the construction of the essential portions of the control system of an external equipment 57 according to the present embodiment.

In FIG. 6, the external equipment 57 is provided with an image inputting portion 310, a system memory 311, an image analyzing portion 312 (image analyzing means), a control processing portion 313, an input/output port 314, a displaying portion. 103, an operating portion 104 and an external memory 105.

The image inputting portion 310 inputs image data thereto from the scanner. The image analyzing portion 312 analyzes the image data inputted form the scanner. The control processing portion 313 serves to control the entire external equipment, and executes the processings shown in the flow charts of FIGS. 7 and 8 (second embodiment), FIGS. 9 and 10 (third embodiment), FIG. 11 (fourth embodiment) and FIG. 12 (fifth embodiment). The system memory 311 stores therein a program describing a procedure executing each processing by the external equipment.

The input/output port 314 governs the inputting and outputting of data between the external equipment 57 and an external device (the displaying portion 103, the operating portion 104 and the external memory 105) added to the external equipment 57. The displaying portion 103 displays image data or the like inputted from the scanner. The operating portion 104 is used when the external equipment is operated. The external memory 105 preserves the image data therein. While in FIG. 6, the external device (the displaying portion 103, the operating portion 104 and the external memory 105) is shown as being made integral with the external equipment 57, the external device may be of a construction made integral with an external equipment main body (e.g. a note type PC), or a construction provided discretely from the external equipment main body (e.g. a desk top type PC).

The operation in the present embodiment will now be described in detail with reference to the flow charts of FIGS. 7 and 8.

Figure 7:
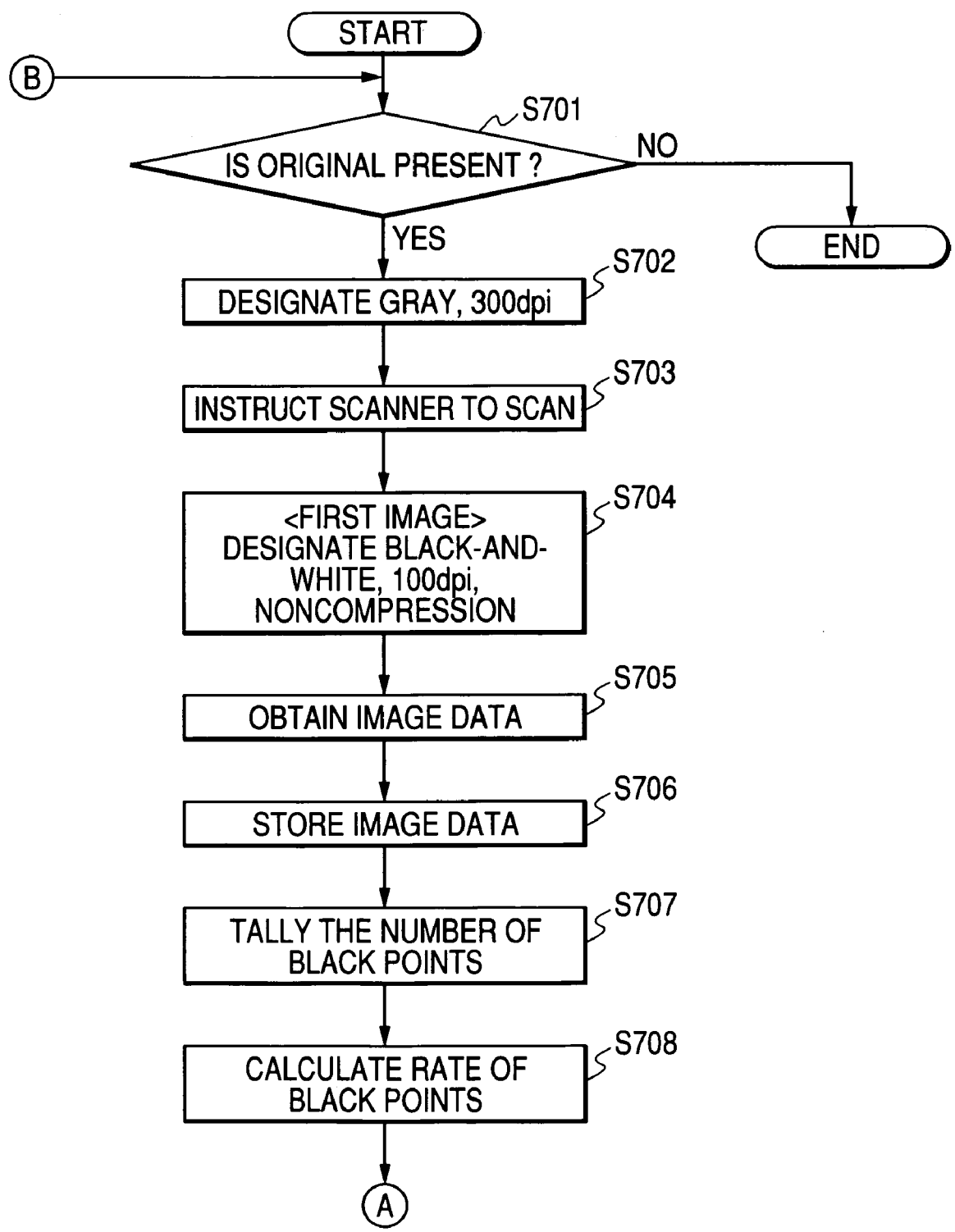
FIG. 7 is a flow chart showing the processing by the external equipment.
Figure 8:
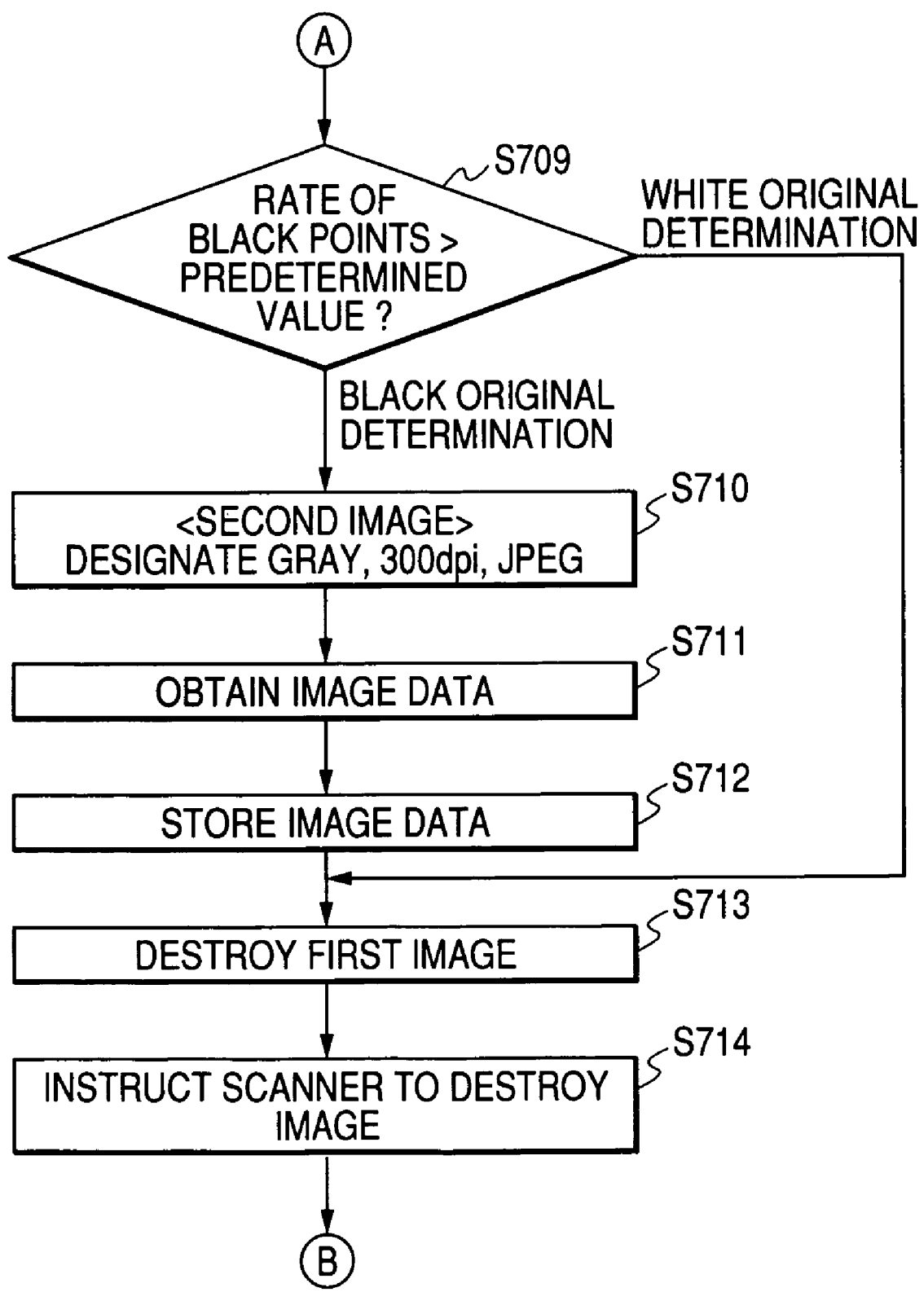
FIG. 8 is the continuation of the flow chart of FIG. 7.

FIGS. 7 and 8 are flow charts showing the processing (blank sheet detecting process) by the external equipment 57.

In FIGS. 7 and 8, the control processing portion 313 of the external equipment 57 issues to the scanner a request for checking up the presence or absence of an original on the original stand 5. The control processing portion 313, if the status transmitted from the scanner is a present status of original (YES at a step S701), instructs the scanner to execute scanning, whereby the reading of the image of the original can be started. On the other hand, if the status transmitted from the scanner is an absent status of original (NO at the step S701), the control scanning portion 313 terminates the original image reading process.

The control processing portion 313, as described in the first embodiment, instructs the scanner to scan at gray scale (resolution 300 dpi) if the desired image component is black-and-white or gray scale (step S702 and step S703), and instructs the scanner to scan at color if the desired image component is color, or desired image processing is dropout or color emphasis. The control processing portion may instruct the scanner to scan at black-and-white if the desired image component is black-and-white.

The control processing portion 313, after it has given the scanner the above-described instructions to scan, effects the obtainment of first data from the scanner at black-and-white which the image component of a first image, the minimum resolution 100 dpi of the scanner which is the image resolution of the first image, and non compression which is the compression form of the first image (step S704 and step S705), and stores the image data in the external memory 105 (step S706).

When the obtainment of the first image data is terminated, the control processing portion 313 tallies the number of black points on the first image data from the image data inputted from the scanner through the image inputting portion 310, by the image analyzing portion 312 (step S709) Next, the control processing portion 313 calculates the rate of black points on the basis of the entire first image data and the number of black points on the first image data by the image analyzing portion 312 (step S708).

The image analyzing portion 312 determines the magnitude relation between the rate of black points and a predetermined value from the result of the above-described calculation (step S709). The image analyzing portion 312, if it has determined that the rate of black points has exceeded the predetermined value, judges that the original is an original on which information such as characters is present (a black original). On the other hand, if it has determined that the rate of black points has not reached the predetermined value, the image analyzing portion 312 judges that the original is an original on which information such as characters is not present (a white original).

If the result of the judgment by the image analyzing portion 312 is an original on which information such as characters is present (a black original), the control processing portion 313 instructs the scanner to change over the image mode. Thus, the scanner changes over the image mode. Next, the control processing portion 313 effects the obtainment of second image data from the scanner at the gray scale which is a desired second image component, 300 dpi which is desired second image resolution, and JPEG compression which is a desired second compression form (step S710 and step S711), and stores the second image data in the external memory (step S712). At this time, the control processing portion 313 destroys the first image data (step S713).

On the other hand, if the result of the judgment by the image analyzing portion 312 is an original having no information such as characters (a white original), the control processing portion 313 destroys the first image data (step S713).

When it destroys the first image data, the control processing portion instructs the scanner to destroy the image (step S714), and effects the obtainment of image data for the next original.

As described above, according to the present embodiment, the process of analyzing the contents of the image scanned from the original (white sheet detecting process) can be carried out with appropriate image data and therefore, it is possible to realize the control of sending the image data form the scanner to the external equipment 57 without increasing the number of the image memories 55 or requiring much time or deteriorating the image.

Third Embodiment

A third embodiment of the present invention will now be described. This embodiment differs from the above-described first embodiments in the points shown in the following description of the operation. The other elements of the present embodiment one the same as those corresponding in FIGS. 1, 2 and 3 and therefore need not be described.

The operation in the present embodiment will now be described in detail with reference to the flow charts of FIGS. 9 and 10.

Figure 9:
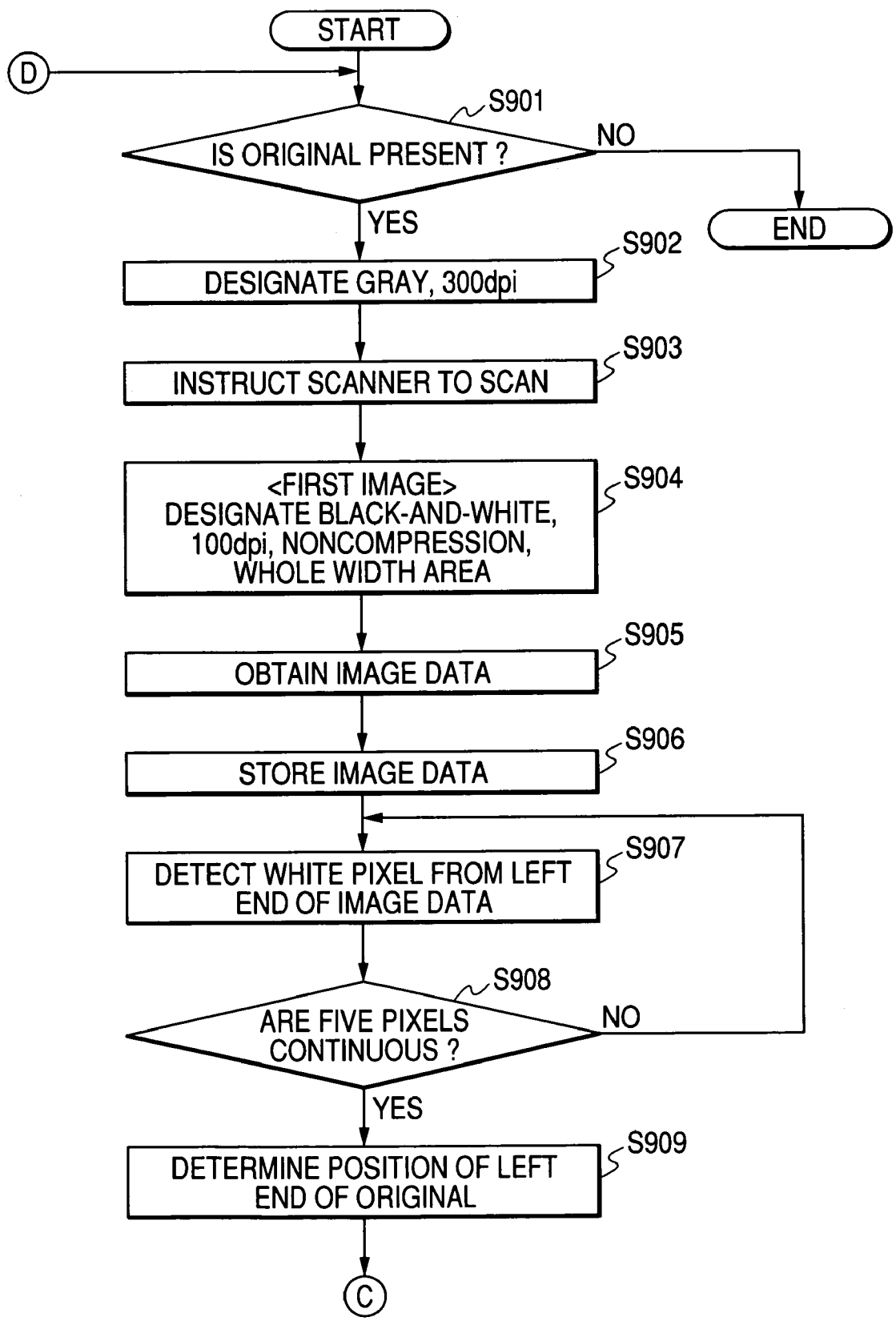
FIG. 9 is a flow chart showing the processing by an external equipment according to a third embodiment of the present invention.
Figure 10:
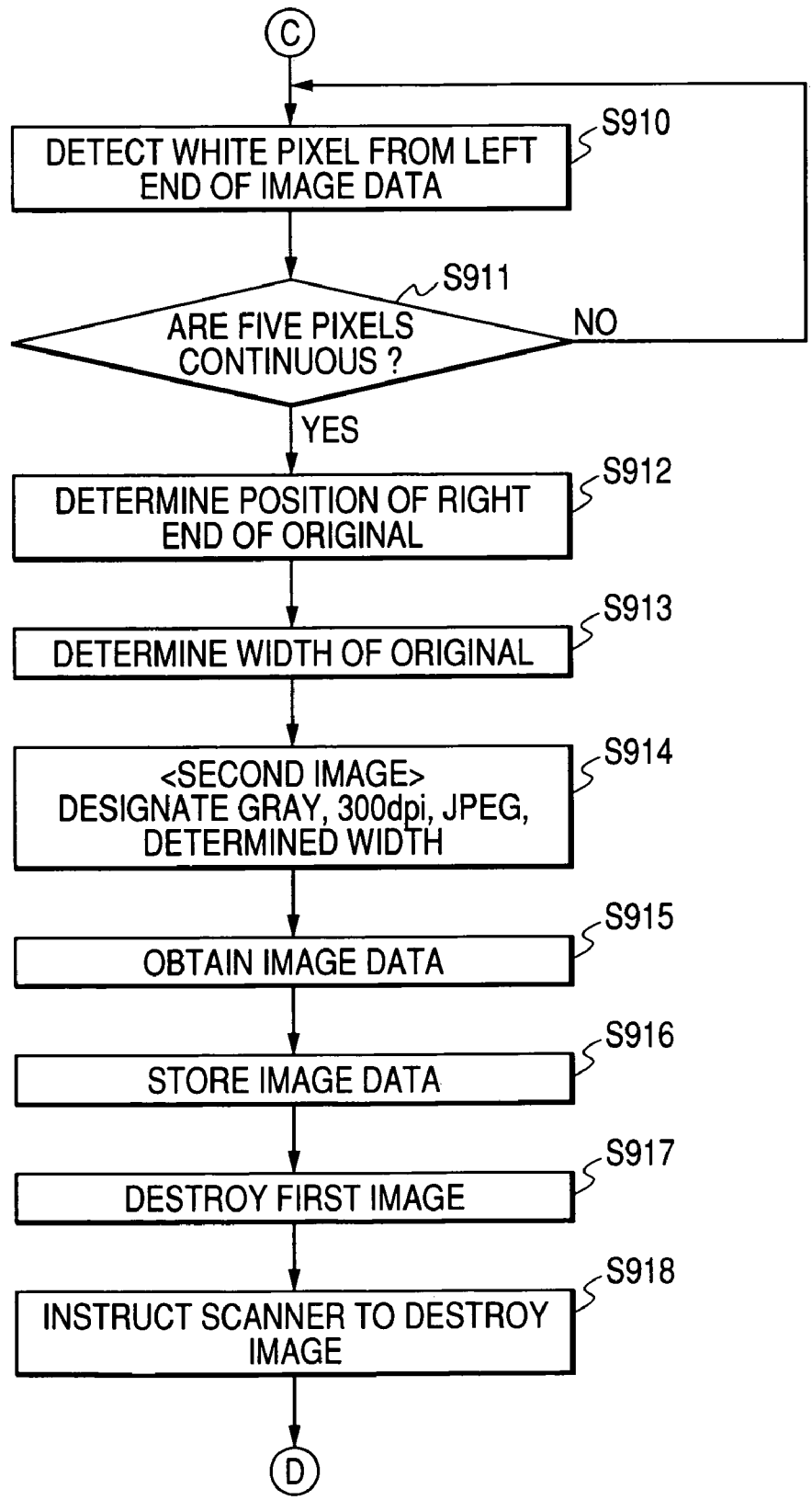
FIG. 10 is the continuation of the flow chart of FIG. 9.

FIGS. 9 and 10 are flow charts showing the processing (original image size detecting process) by the external equipment 57.

In FIGS. 9 and 10, a step S901 to a step S906 are similar to the above-described step S701 to step S706, and step S914 to step S918 are similar to the above-described step S710 to step S714 and therefore need not be described. The obtainment of image data at the step S905 need not be the entire image area, but may be several lines necessary to detect the width of the image of the original.

When the obtainment of the first image data is terminated, the control processing portion 313 looks up an original image on the first image data from the first image data inputted from the scanner through the image inputting portion 310, by the image analyzing portion 312. In the present embodiment, the scanner has its back ground made black and therefore, can look up a white pixel in the first image data to thereby look up the original image. It is to be understood that the original image on the first image data is looked up, for example, with respect only to a main scanning direction, and can be looked up with respect to a sub-scanning direction by the time when the original has passed the sensor P1 of the scanner.

First, the image analyzing portion 312 looks up a white pixel on the first image data from the left end of the main scanning direction (step S907). In this case, the position of a pixel first recognized at a point of time whereat several white pixels have been continuously recognized is regarded as the left end of the original in the first image data. For example, let it be assumed that a black pixel has been recognized from the left end of the main scanning direction on the first image data, and white pixels have been recognized continuously from the 100th pixel to the 105th pixel (YES at a step S908). In this case, the 100th pixel is determined as he left end of the original in the first image data (step S909).

Next, the image analyzing portion 312 looks up a white pixel on the first image data from the right end of the main scanning direction (step S910). The position of a pixel first recognized at a point of time whereat several white pixels have been continuously recognized is regarded as the right end of the original in the first image data. For example, let it be assumed that a black pixel has been recognized from the right end of the main scanning direction on the first image data, and white pixels have been recognized continuously from the 150th pixel to the 155th pixel (YES at a step S911). In this case, the 150th pixel is determined as the right end of the original in the first image data (step S912).

In this manner, the pixel position at the left end of the original and the pixel position at the right end of the original in the first image data can be looked up. Thereby, the image width of the original (the width from the pixel position at the left end of the original to the pixel position at the right end of the original is determined (step S913).

Next, the control processing portion 313 instructs the scanner to change over the image mode in an image area based on the result of the looking-up by the image analyzing portion 312 thus, the scanner changes over the image mode. The control processing portion 313 carries out the processings of the subsequent steps S914 to S918. In this case, the scanner forwards the second image data to the external equipment 57 by the designation of the image area of the second image data based on the result of the detection of the original size by the external equipment 57.

As described above, according to the present embodiment, the process of analyzing the contents of the image scanned from the original (the original image size detecting process) can be carried out with appropriate image data and therefore, it is possible to realize the control of sending the image data fro the scanner to the external equipment 57 without increasing the number of the image memories 55 or requiring much time or deteriorating the image.

Fourth Embodiment

A fourth embodiment of the present invention will now be described. This embodiment differs from the above-described first embodiment in the points shown in the following description of the operation. The other elements of the present embodiment are the same as those corresponding in FIGS. 1, 2, 3 and 6 described above and therefore need not be described.

The operation in the present embodiment will now be described in detail with reference to the flow chart of FIG. 11.

Figure 11:
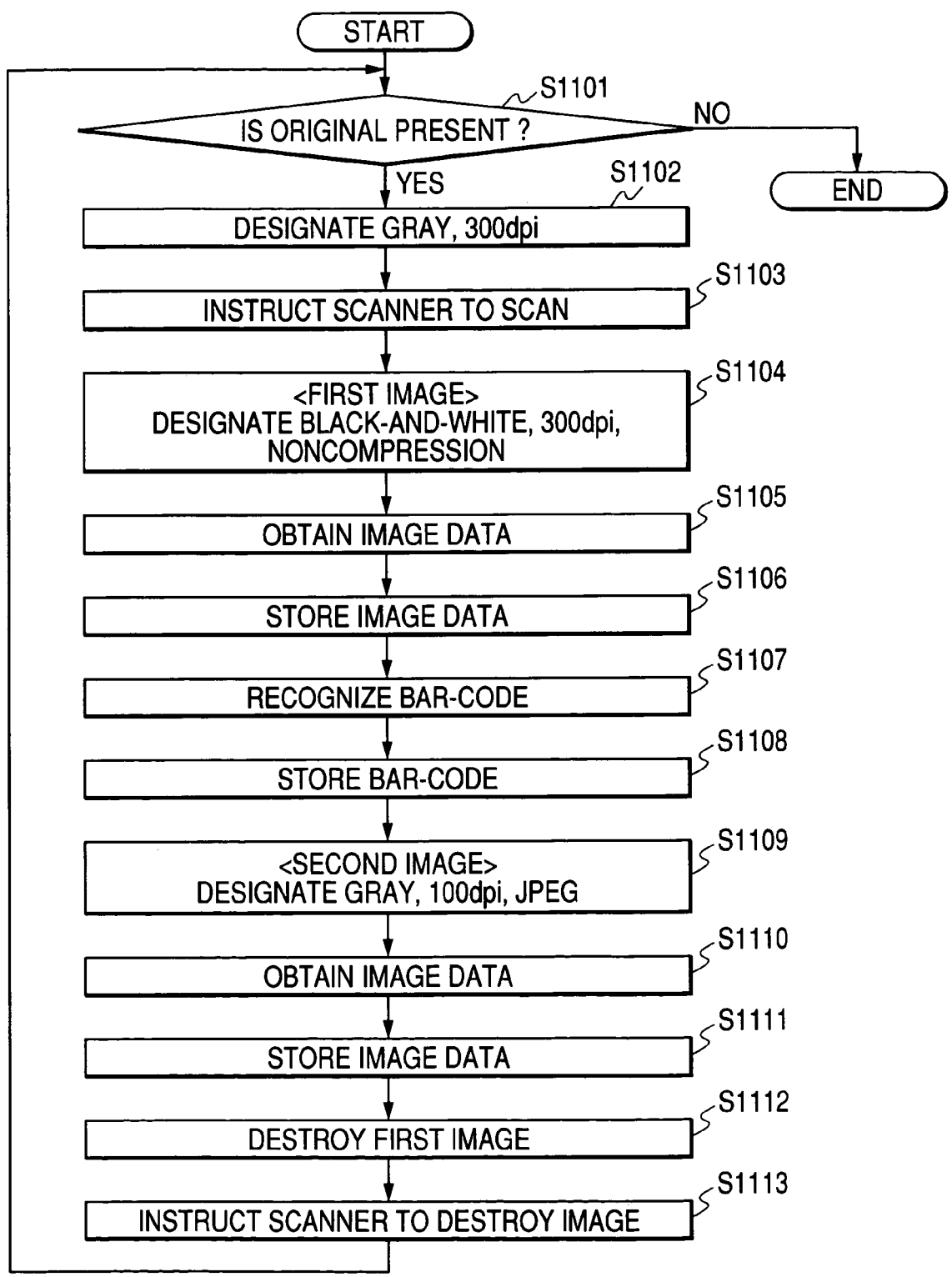
FIG. 11 is a flow chart showing the processing by an external equipment according to a fourth embodiment of the present invention.

FIG. 11 is a flow chart showing the processing (the bar-code detecting process) by the external equipment 57.

In FIG. 11, except the resolution, a step S1101 to a step S1106 are similar to the above-described step S701 to step S706, and a step S1109 to a step S1113 are similar to the above-described step S710 to step S714 and therefore, need not be described.

In the present embodiment, the first image data is obtained at "black-and-white, resolution 300 dpi, noncompression", and the second image data is obtained at "gray scale, resolution 100 dpi, JPEG compression".

In the present embodiment, the detection of a bar-code printed on an original to be scanned is effected and therefore, minimum image resolution for effecting the detection of the bar-code is required. In the present embodiment, the minimum image resolution for effecting the detection of the bar-code is 300 dpi, and the external equipment 57 instructs the scanner to scan at image resolution of 300 dpi or greater in advance. Consequently, as shown in the first embodiment, the external equipment 57 instructs the scanner to scan at 300 dpi even if the desired image resolution is 300 dpi or less.

When the obtainment of the first image data is terminated, the control processing portion 313 effects the recognition of the bar-code on the first image data from the first image data inputted from the scanner through the image inputting portion 310, by the image analyzing portion 312 (step S1107). In this case, it is to be understood that the recognition of the bar-code can be effected by known bar-code recognizing means. The control processing portion 313 uses the known bar-code recognizing means to store the result of the recognition by the image analyzing portion 312 into the external memory 105 (step S1108).

Next, the control processing portion 313 instructs the scanner to change over the image mode. Thus, the scanner changes over the image mode. The control processing portion 313 carries out the processings of the subsequent steps S1109 to S1113.

As described above, according to the present embodiment, the process of analyzing the contents of the image scanned from the original (the bar-code detecting process) can be carried out with appropriate image data and therefore, it is possible to realize the control of sending the image data from the scanner to the external equipment 57 without increasing the number of the image memories 55 or requiring much time or deteriorating the image.

Fifth Embodiment

A fifth embodiment of the present invention will now be described. This embodiment differs form the above-described first embodiment in the points shown in the following description of the operation. The other elements of the present embodiment are the same as those corresponding in FIGS. 1, 2, 3 and 6 described above and therefore need not be described.

The operation in the present embodiment will now be described in detail with reference to the flow chart of FIG. 12.

Figure 12:
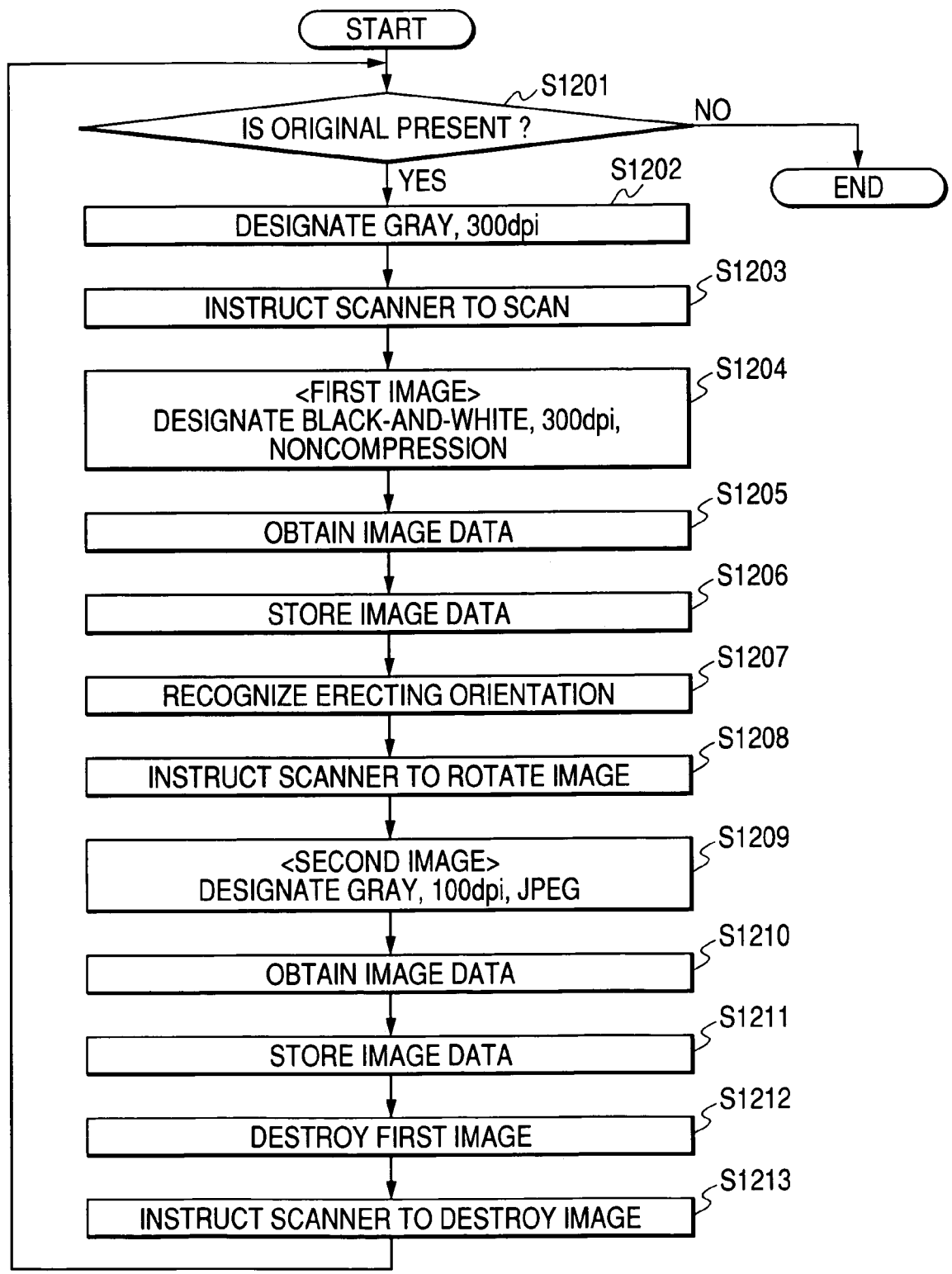
FIG. 12 is a flow chart showing the processing by an external equipment according to a fifth embodiment of the present invention.
Figure 13:
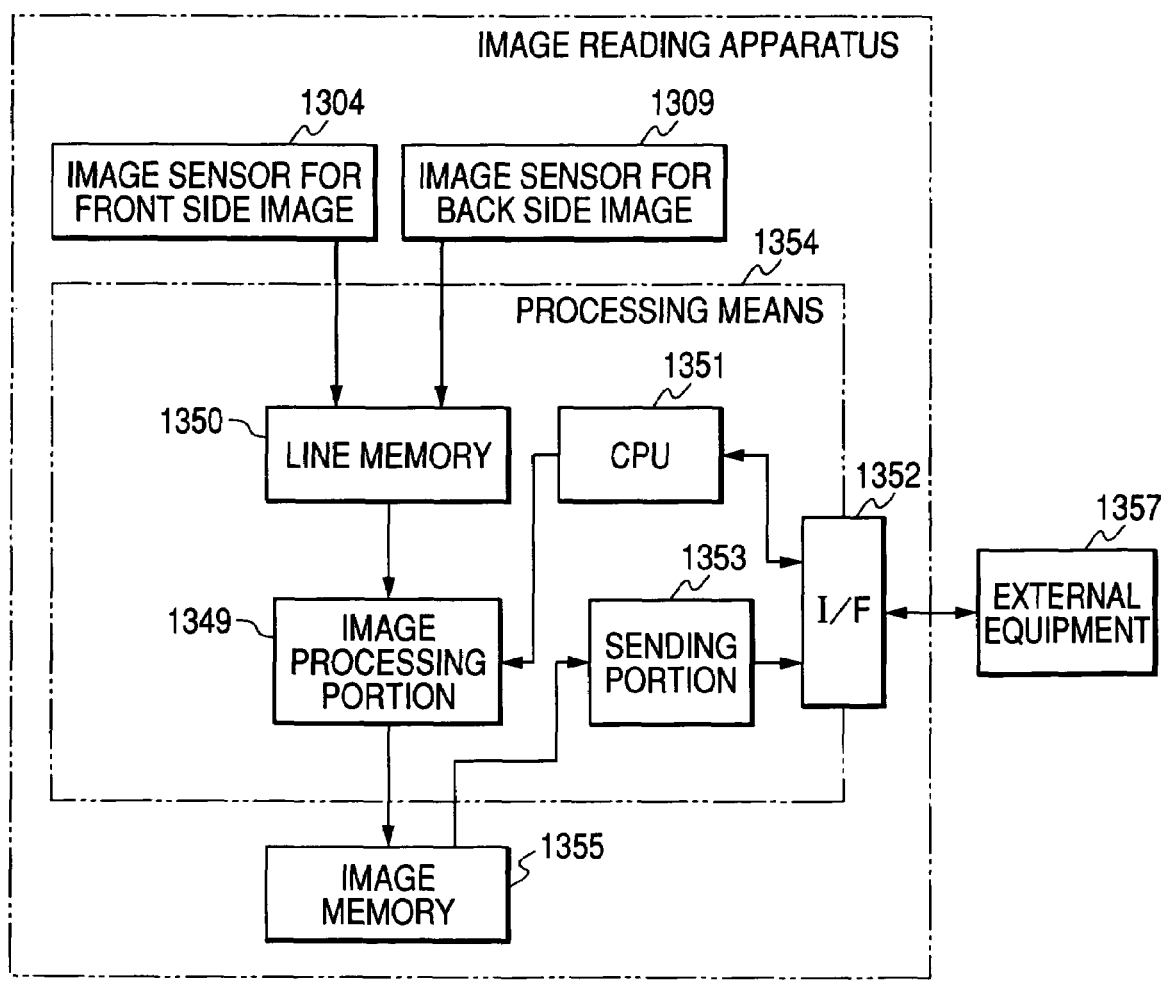
FIG. 13 is a block diagram showing an example of the construction of the essential portions of the control system of an image reading apparatus according to the prior art.
Figure 14:
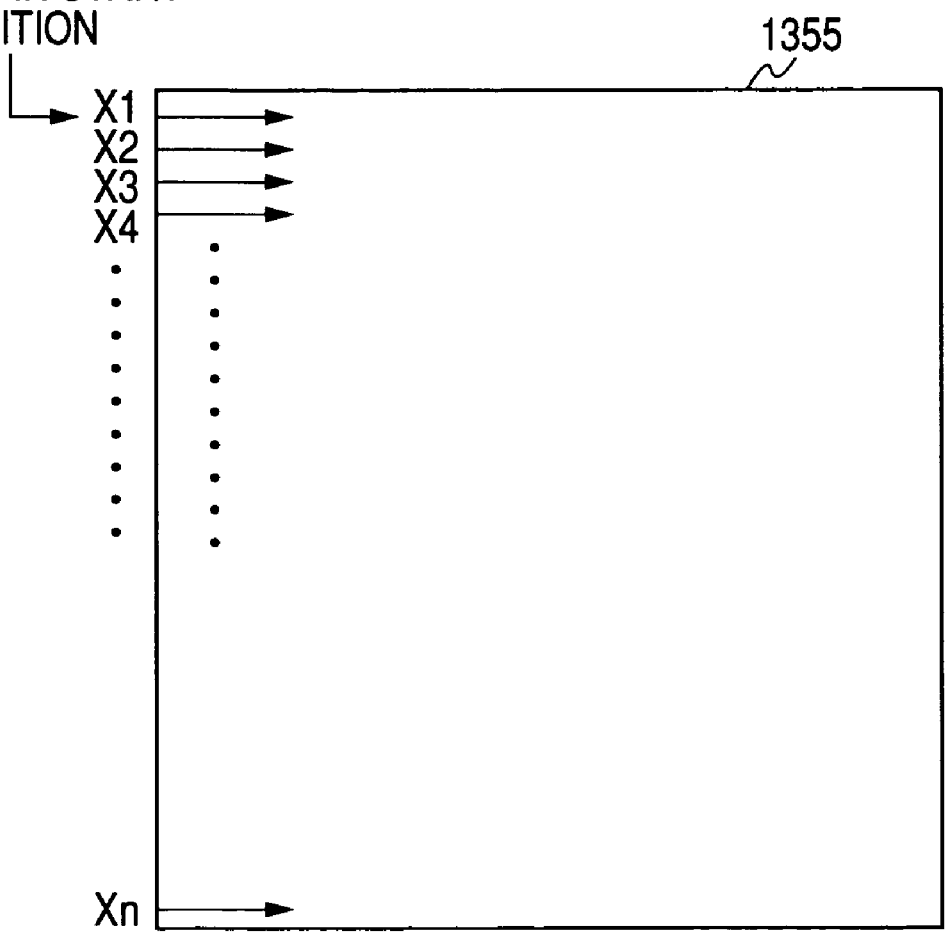
FIG. 14 shows the writing-in start position of the image memory of the image reading apparatus of FIG. 13.

FIG. 12 is a flow chart showing the processing (the orientation detecting process) by the external equipment 57.

In FIG. 12, except the resolution, a step S1201 to a step S1206 are similar to the above-described step S701 to step S706, and a step S1209 to a step S1213 are similar to the above-described step S710 to step S714 and therefore, need not be described.

In the present embodiment, the first image data is obtained at (black-and-white), resolution 300 dpi, noncompression", and the second image data is obtained at "gray scale, resolution 100 dpi, JPEG compression".

In the present embodiment, orientation detection (the function of effecting image erection with respect to the conveying direction of the original) is effected and therefore, minimum image resolution for effecting the orientation detection is required. In the present embodiment, the minimum image resolution for effecting the orientation detection is 300 dpi, and the external equipment 57 instructs the scanner to scan at image resolution of 300 dpi or greater in advance. Consequently, as shown in the first embodiment, the external equipment instructs the scanner to scan at 300 dpi even if the desired image resolution is 300 dpi or less.

When the obtainment of the first image data is terminated, the control processing portion 313 calculates (recognizes) the erecting orientation of the original image on the first image data from the orientation of the characters of the first image data inputted from the scanner through the image inputting portion 310, by the image analyzing portion 312 (step S1207). It is to be understood that the calculation of the erecting orientation can be effected by known erecting orientation recognizing means. Next, the control processing portion 313 instructs the scanner to rotate the first image data (erect the first image data) (step S1208). It is to be understood that the erection of the first image data can be effected by known image rotating means, and that it can be effected by the image processing portion 49 in the scanner.

Next, the control processing portion 313 instructs the scanner to change over the image mode. Thus, the scanner changes over the image mode. The control processing portion 313 carries out the processings of the subsequent steps S1209 to S1213.

As described above, according to the present embodiment, the process of analyzing the contents of the image scanned from the original (the orientation detecting process) can be carried out with appropriate image data and therefore, it is possible to realize the control of sending the image data from the scanner to the external equipment 57 without increasing the number of the image memories 55 or requiring much time or deteriorating the image.

Other Embodiments

While in the first to fifth embodiments, a sheet-through type scanner which reads an image while conveying an original has been mentioned as an example, the present invention can also be applied to a flat fed type scanner which reads an image with an original placed on an original stand, or a microfilm scanner which reads the image of microfilm, or a film scanner which reads the image of photographic film, or a digital camera.

Also, while in the first embodiment a case where the external equipment 57 obtains image data in two kinds of image modes (first and second image modes) has been mentioned as an example, the number of the image modes may be three or more.

Also, while in the first embodiment, a case where in the first image mode, use is made of "resolution 100 dpi, JPEG compression", and in the second image mode, use is made of "resolution 300 dpi, MMR compression" has been mentioned as an example, the present invention can also be applied to other resolutions and other compression forms, and can also be applied to noncompression.

Also, while in the second and third embodiment, a case where the first image data is obtained at "black-and-white, resolution 100 dpi, noncompression" has been mentioned as an example, the first image data may be obtained at gray scale or color, other resolution, JPEG compression, or a compressing method such as MMR compression. Also, while a case where desired second image data is obtained at "gray scale, resolution 300 dpi, JPEG compression" has been mentioned as an example, the desired second image data may be obtained at black-and-white or color, other resolution, a compressing method such as MMR compression, or noncompression.

Also, while in the second to fifth embodiments, a case where the first image data is destroyed has been mentioned as an example, the first image data may not be destroyed, but may be stored in the external memory 105 of the external equipment 57. Also, the first image data, or the first image data and desired second image data, or desired second image data may be outputted as a file.

Also, in the second embodiment, when it is judged that the first image data is image data read from an original on which information such as characters is present, the first image data may be used for other detecting process such as original image size detection or orientation detection.

Also, while in the second to fifth embodiments, a case where image data is divisionally obtained two times when the external equipment 57 is to obtain an image datum from the scanner has been mentioned as an example, the obtainment of the image data may be effected three or more times.

Also, while in the second embodiment, a case where the obtainment of a plurality of image data is effected for an image in one and the same image area has been mentioned as an example, image data can be read out in advance in a narrow image area, and after the external equipment 57 has effected white sheet judgment as to whether the original is a white original or a black area, the image data can also be read out in a desired image area.

Also, while in the second embodiment, the white sheet detecting method as described above has been mentioned as an example, the white sheet detecting method is an example to the last. For example, the image data can be JPEG-compressed and white sheet detection can be effected from the compressed size, and a known white sheet detecting method or the like can also be used.

Also, while in the third embodiment, looking-up has been effected with respect only to the main scanning direction when the original image in the image data is to be looked up, looking-up may be effected with respect to the sub-scanning direction. In this case, the image data is read out in a wide image area in advance, and after the external equipment 57 has effected the judgment of the position of the original image in the image data with respect to the main scanning direction and the sub-scanning direction, the image data can also be read out in an image area based on the result of the judgment.

Also, while in the third embodiment, the original image size detecting method as described above has been mentioned as an example, the original image size detecting method is an example to the last. For example, even in a case where the color of the background of the scanner is not black, if the difference thereof from the original can be distinguished, detection can be accomplished, and a known image size detecting method or the like can also be used.

Also, the third embodiment can be used also in combination with the first and second embodiments, and in that case, it is unnecessary to obtain discrete image data in order to effect black-and-white pixel determination, original image size detection and respective analyses, and the above-described image data may be used in common.

Also, while in the fourth and fifth embodiments, a case where the first image data is obtained at "black-and-white, resolution 300 dpi, noncompression" has been mentioned as an example, the first image data may be obtained by a compressing method such as gray scale or color, other resolution, JPEG compression or MMR compression. Also, while a case where the desired second image data is obtained at "gray scale, resolution 100 dpi, JPEG compression" has been mentioned as an example, the desired second image data may be obtained by a compressing method such as black-and-white or color, other resolution, MMR compression, or noncompression.

Also, while in the fourth embodiment, the obtainment of a plurality of image data has been effected for the image of one and the same area, image data is read out in an image area of which the bar-code position has been designated in advance, and after the external equipment 57 has effected the recognition of the bar-code of the original, image data can also be read out in a desired image area. Also, in order to effect the recognition of a plurality of bar-codes, the image data may be read out in a plurality of image areas of which the bar-code positions have been designated in advance.

Also, while in the fourth embodiment, the bar-code preserving method as described above has been mentioned as an example, the bar-code preserving method is an example to the last. For example, bar-code information may be added to the image data and may be preserved in the external memory 105. Of course, the present invention can be utilized for the analysis of not only the bar-code, but also for the analysis of other codes.

Also, the fourth embodiment can be used in combination with the first to third embodiments, and in that case, in order to effect black-and-white pixel determination, original image size detection, bar-code detection and respective analyses, it is unnecessary to obtain discrete image data, and the above-described first image data may be used in common.

Also, while in the fifth embodiment, the obtainment of a plurality of image data has been effected for the image of one and the same image area, image data can be read out in a narrow image area in advance, and after the external equipment 57 has effected the orientation detection of the original, image data can also be read out in a desired image area.

Also, in the fifth embodiment, the orientation detecting method as described above has been mentioned as an example, but the orientation detecting method is an example to the last. It is also possible to effect orientation detection from the other contents of the image than the orientation of characters, the original size, the length to breadth ratio of the image, etc. The present invention can also be applied, for example, to skew feed detection which detects the skew feed angle of the original in the scanner during the conveyance of the original. In this case, the skew feed correcting process of correcting skew feed may be carried out by the image analyzing portion 312 of the external equipment 57, instead of being effected by the image processing portion 49 in the scanner. That is, desired second image is obtained, and after the skew feed correction has been effected by the image analyzing portion 312, the image data subjected to the skew feed correction can also be stored in the external memory 105.

Also, the fifth embodiment can be used also in combination with the first to fourth embodiments, and in that case, in order to effect black-and-white pixel determination, original image size detection, bar-code detection, orientation detection, skew feed detection and respective analyses, it is unnecessary to obtain discrete image data, and the above-described first image data may be used in common.

Also, in the second to fifth embodiments, there may be effected such notifications as displaying the result of the detection by each detecting process on the displaying portion 103 of the external equipment 57, displaying it on the displaying portion (not shown) of the scanner, and outputting a warming voice in the case of abnormality.

The present invention can be achieved by supplying a computer or a CPU with the program (the flow charts of FIGS. 4, 5, 7, 8, 9, 10, 11 and 12) of software realizing the functions of the above-described embodiments, and the computer or the CPU reading out and executing the supplied program.

In this case, the above-described program is directly supplied from a storage medium having the program recorded therein, or is supplied by being downloaded from other computer, not shown, or a data base or the like connected to the internet, a commercially available network or a local area network or the like.

The form of the above-described program may comprise the form of an object code, a program code executed by an interpreter, script data supplied to an operating system (OS), or the like.

The present invention can also be achieved by supplying a computer or a CPU with a storage medium storing therein the program of software realizing the functions of the above-described embodiments, and the computer or the CPU reading out and executing the program stored in the storage medium.

In this case, the program code itself read out form the storage medium realizes the functions of the above-described embodiments, and also the storage medium storing the program code therein constitutes the present invention.

As the storage medium storing the program code therein, there is, for example, a ROM, a RAM, an NV-RAM, a Floppy (registered trademark) disk, a hard disk, an Optical Disk (registered trademark), a magneto-optical disk, a CD-ROM, an MO, a CD-R, a CD-RW, a DVD-ROM, a DVD-RAM, a DVD-RW, a DVD+RW, a magnetic tape, a non-volatile memory card or the like.

The functions of the above-described embodiments can be realized not only by executing the program code read out form the computer, but also by an OS or the like working on the computer executing part or the whole of actual processing on the basis of the instructions of the program code.

As described above, according to the first to fifth embodiments and other embodiments, the following effects can be obtained.

First, the image processing means is disposed in the route along which the image data is forwarded from the storing means to the sending means, and the image processing contents (one of conversion of the number of colors, image gradation number conversion, image resolution conversion, image area conversion, image compression and image rotation, or one of combinations thereof) of the image processing means are made changeable over, that is, image processing is effected by the image processing means when the image data stored in the storing means has been read out, whereby it becomes unnecessary to repeat the operation of storing the image data into the storing means while effecting image processing, as in the prior art, and one operation of storing the image data into the storing means is enough, and it becomes unnecessary to provide a mechanism for storing the image data into the storing means a plurality of times.

Also, such one operation of storing the image data into the storing means as described above can be realized simply by changing the disposition of the image processing means without increasing the number of the storing means and therefore, the addition of hardware is unnecessary and a reduction in cost can be achieved, and also the time for obtaining the image data from the image processing apparatus by the external equipment can be shortened and the obtainment efficiency of the image data can be improved.

Also, the image processing contents based on the first image condition and the image processing contents based on the second image condition are changed over, and one or both of the first image data image-processed under the first image condition and the second image data image-processed under the second image condition are sent to the external equipment and therefore, the obtainment efficiency of the image data from the image processing apparatus by the external equipment can be improved.

Also, image data read form an original is stored in the storing means under an image condition under which both of the first image data and the second image data can be produced and therefore, for one operation of storing the image data into the storing means, the image data can be obtained under a plurality of image conditions.

Also, whether an original from which the first image data image-processed under the first image condition and sent from the image processing apparatus has been read is a white sheet is detected, and on the basis of the result of the detection, the second image data image-processed under the second image condition and sent from the image processing apparatus is obtained and therefore, it becomes possible to carry out the process of analyzing the contents of the image read from the original (the white sheet detecting process) with appropriate image data, and it is possible to realize the control of outputting the image data from the image processing apparatus to the external equipment without increasing the number of the storing means or requiring much time or deteriorating the image.

Also, the size of the image of an original from which the first image data image-processed under the first image condition and sent from the image processing apparatus has been read is detected, and on the basis of the result of the detection, the second image data image-processed under the second image condition and sent from the image processing apparatus is obtained and therefore, it becomes possible to carry out the process of analyzing the contents of the image read from the original (the original size detecting process) with appropriate image data, and it is possible to realize the control of outputting the image data from the image processing apparatus to the external equipment without increasing the number of the storing means or requiring much time or deteriorating the image.

Also, whether a code is present on an original from which the first image data image-processed under the first image condition and sent from the image processing apparatus has been read is detected, and the result of the detection is stored, and the second image data image-processed under the second image condition and sent from the image processing apparatus is obtained and therefore, it becomes possible to carry-out the process of analyzing the contents of the image read from the original (the code detecting process) with appropriate image data, and it is possible to realize the control of outputting the image data from the image processing apparatus to the external equipment without increasing the number of the storing means or requiring much time or deteriorating the image.

Also, the orientation of an original from which the first image data image-processed under the first image condition and sent from the image processing apparatus has been read is detected, and on the basis of the result of the detection, the second image data image-processed under the second image condition and sent from the image processing apparatus is obtained and therefore, it becomes possible to carry out the process of analyzing the contents of the image read from the original (the orientation detecting process) with appropriate image data, and it is possible to realize the control of outputting the image data from the image processing apparatus to the external equipment without increasing the number of the storing means or requiring much time or deteriorating the image.

Also, the first image data is used in common in the detecting processes in the image analyzing means and therefore, it becomes unnecessary to obtain discrete image data in order to carry out the respective detecting processes.

What is claimed is:

1. An image processing apparatus comprising:
    a storing unit which stores image data read from an original by a reading unit;
    an image processing unit which selectively executes image processing on the image data stored in said storing unit to produce first mode image data based on a first image condition from the image data and to produce second mode image data based on a second image condition; and
    a sending unit which sends the processed image data to an external equipment,
    wherein the first mode image data is produced by said image processing unit based on a first command received from the external equipment, and the first mode image data is sent to the external equipment by said sending unit, and after sending the first mode image data, a second command is received from the external equipment and the second mode image data different from the first mode image data is produced from the image data stored in said storing unit based on the second command received from the external equipment, and is sent to the external equipment by said sending unit.

2. An image processing apparatus according to claim 1, wherein the first mode image data is analyzed in the external equipment, and on the basis of a result of the analysis, the production of said second mode image data is controlled.

3. An image processing apparatus according to claim 2, wherein the first mode image data is analyzed in the external equipment to detect whether the read original is a white sheet.

4. An image processing apparatus according to claim 2, wherein the first mode image data is analyzed in the external equipment to detect a size of the read original.

5. An image processing apparatus according to claim 2, wherein the first mode image data is analyzed in the external equipment to detect code information on the read original.

6. An image processing apparatus according to claim 2, wherein the first mode image data is analyzed in the external equipment to detect an orientation of the read original.

7. A controlling method of controlling an image processing apparatus provided with a storing unit which stores image data read from an original by a reading unit, an image processing unit which executes image processing effected on the image data, and a sending unit which sends the image data to an external equipment, said controlling method comprising:
    using an image processing apparatus to perform steps including:
    a storing step of storing in the storing unit the image data read from the original by the reading unit;
    a first receiving step of receiving a first command from the external equipment;
    an image processing step of executing the image processing effected on the image data stored in the storing unit to produce first mode image data by the image processing unit based on the first command;
    a sending step of sending the first mode image data to the external equipment by the sending unit;
    a second receiving step of receiving a second command from the external equipment after said sending step; and
    a producing step of producing second mode image data different from the first mode image data based on the second command.

8. A controlling method according to claim 7, further comprising a controlling step of controlling said producing step of producing the second mode image data on the basis of a result of an analysis of the first mode image data analyzed by the external equipment.

9. A controlling method according to claim 8, further comprising a detecting step of detecting whether the read original is a white sheet on the basis of the result of the analysis.

10. A controlling method according to claim 8, further comprising a detecting step of detecting a size of the read original on the basis of the result of the analysis.

11. A controlling method according to claim 8, further comprising a detecting step of detecting code information on the read original on the basis of the result of the analysis.

12. A controlling method according to claim 8, further comprising a detecting step of detecting an orientation of the read original on the basis of the result of the analysis.

13. An image processing apparatus comprising:
    a storing unit which stores image data read from an original by a reading unit;
    an image processing unit which executes image processing on the image data stored in said storing unit; and
    a sending unit which sends the processed image data to an external equipment,
    wherein first mode image data is produced by said image processing unit based on a first command received from the external equipment, and the first mode image data is sent to the external equipment by said sending unit, and after sending the first mode image data, a second command is received from the external equipment and second mode image data different from the first mode image data is produced based on the second command received from the external equipment.

14. An external equipment for operation with an image processing apparatus, comprising:
    an image inputting unit which inputs image data from said image processing apparatus;
    a storing unit which stores the image data therein from said image inputting unit;
    an image analyzing unit which analyzes the image data stored in said storing unit; and
    a controlling unit which controls said image inputting unit, said storing unit, and said image analyzing unit, so that said controlling unit sends a first command to said image processing apparatus requesting first mode image data, and the first mode image data is inputted by said image inputting unit for analysis of image content and is stored in said storing unit, wherein, according to the analysis on the first mode image data stored in said storing unit by said image analyzing unit, said controlling unit sends a second command to said image processing apparatus requesting second mode image data different from the first mode image data, and thereafter the second mode image data is inputted by said image inputting unit.

15. A controlling method of controlling an external equipment provided with an image inputting unit which inputs image data from an image processing apparatus, a storing unit which stores the image data therein from said image inputting unit, and an image analyzing unit which analyzes the image data stored in said storing unit, said controlling method comprising:

using the external equipment to perform steps including:
a first sending step of sending a first command to the image processing apparatus requesting first mode image data;
a first inputting step of inputting the first mode image data from said image processing apparatus by the image inputting unit for analysis of image content;
a storing step of storing the first mode image data in the storing unit of said external equipment;
an analyzing step of analyzing the first mode image data stored in said storing unit by said image analyzing unit;
a second sending step of sending a second command to the image processing apparatus, according to the analysis on the first mode image data, requesting second mode image data different from the first mode image data; and
a second inputting step of inputting the second mode image data from the image processing apparatus by the image inputting unit after said second sending step.

16. A computer-readable storage medium which stores a computer program for causing a computer to carry out a controlling method of controlling an external equipment provided with an image inputting unit which inputs image data from an image processing apparatus, a storing unit which stores the image data therein from said image inputting unit, and an image analyzing unit which analyzes the image data stored in said storing unit, said computer program causing the computer to execute steps comprising:

a first sending step of sending a first command to the image processing apparatus requesting first mode image data;
a first inputting step of inputting the first mode image data from said image processing apparatus by the image inputting unit for analysis of image content;
a storing step of storing the first mode image data in the storing unit of said external equipment;
an analyzing step of analyzing the first mode image data stored in said storing unit by said image analyzing unit;
a second sending step of sending a second command to the image processing apparatus, according to the analysis on the first mode image data, requesting second mode image data different from the first mode image data; and
a second inputting step of inputting the second mode image data from the image processing apparatus by the image inputting unit after said second sending step.

17. An image processing apparatus comprising:
a storing unit which stores therein image data read from an original by a reading unit;
an image processing unit which executes image processing of producing first mode image data, for analysis performed by external equipment to detect whether the read original is a white sheet or not, from the image data stored in the storing unit; and
a sending unit which sends the image data to the external equipment,
wherein the image processing is effected on the image data stored in said storing unit and the first mode image data is produced by said image processing unit based on a first command received from the external equipment, and the first mode image data is sent to the external equipment by said sending unit, and
after sending the first mode image data, a second command based on a white sheet detecting process performed by the external equipment is received from the external equipment, and second mode image data different from the first mode image data is sent based on the second command to the external equipment by said sending unit.

18. A controlling method of controlling an image processing apparatus provided with a storing unit which stores therein image data read from an original by a reading unit, an image processing unit which executes image processing of producing first mode image data, for analysis performed by external equipment to detect whether the read original is a white sheet or not, from the image data stored in the storing unit, and a sending unit which sends the image data to the external equipment, said controlling method comprising: using the image processing apparatus to perform steps including: a storing step of storing in the storing unit the image data; a first receiving step of receiving a first command from the external equipment; an image processing step of executing the image processing effected on the image data stored in the storing unit to produce the first mode image data by the image processing unit based on the first command; a first sending step of sending the first mode image data to the external equipment by the sending unit; a second receiving step of receiving a second command, based on a white sheet detecting process performed on the external equipment, from the external equipment after said first sending step; and a second sending step of sending second mode image data different from the first mode image data based on the second command to the external equipment by said sending unit.

* * * * *